March 14, 1967 J. D. BARGAINER, JR 3,309,521

TRANSMISSION OF WELL LOGGING SIGNALS IN BINARY OR DIGITAL FORM

Filed June 18, 1963 12 Sheets-Sheet 4

March 14, 1967 J. D. BARGAINER, JR 3,309,521

TRANSMISSION OF WELL LOGGING SIGNALS IN BINARY OR DIGITAL FORM

Filed June 18, 1963 12 Sheets-Sheet 6

March 14, 1967 J. D. BARGAINER, JR 3,309,521

TRANSMISSION OF WELL LOGGING SIGNALS IN BINARY OR DIGITAL FORM

Filed June 18, 1963 12 Sheets-Sheet 7

March 14, 1967 J. D. BARGAINER, JR 3,309,521

TRANSMISSION OF WELL LOGGING SIGNALS IN BINARY OR DIGITAL FORM

Filed June 18, 1963 12 Sheets-Sheet 8

March 14, 1967 J. D. BARGAINER, JR 3,309,521

TRANSMISSION OF WELL LOGGING SIGNALS IN BINARY OR DIGITAL FORM

Filed June 18, 1963 12 Sheets-Sheet 10

March 14, 1967 J. D. BARGAINER, JR 3,309,521

TRANSMISSION OF WELL LOGGING SIGNALS IN BINARY OR DIGITAL FORM

Filed June 18, 1963 12 Sheets-Sheet 11

United States Patent Office 3,309,521

Patented Mar. 14, 1967

3,309,521

TRANSMISSION OF WELL LOGGING SIGNALS IN BINARY OR DIGITAL FORM

James D. Bargainer, Jr., Dallas, Tex., assignor to Mobil Oil Corporation, a corporation of New York Filed June 18, 1963, Ser. No. 288,716
62 Claims. (Cl. 250—83.3)

This invention relates to well logging and more particularly to the generation and transmission of signals from a borehole to the surface and has for an object the provision of an improved system for generating and transmitting, from a borehole to the surface of the earth, intelligence signals in binary or digital form by way of at least one transmission line.

In the field of well logging, intelligence signals, such as electrical pulses, generally are transmitted over a conductor from a borehole to a recording system located at the surface of the earth. In the field of radioactive well logging, the pulses are generated in response to radiation detected in the borehole and are transmitted to the surface to obtain measurements which reflect information about the characteristics of the formations. Since the radiation detected occurs at a high intensity level, the electrical pulses must be generated and transmitted at a high frequency to obtain the most useful information at the surface of the earth.

For economic reasons, it is desirable to employ, in radioactive well logging systems, the same conventional multi-conductor cables which are readily available in the field and are generally in use in other types of well logging. These cables, however, have relatively poor high frequency response and cause the high frequency pulses to be seriously affected or distorted in height and shape upon transmission. For example, these cables exhibit a high level of signal noise which adds to the height of the pulses. The noise is not constant but varies. In addition, the high frequency pulses are spread out by the time they reach the surface due to the fact that the different frequency components of each pulse are transmitted at different velocities. Furthermore, the high frequency components of the pulses are attenuated upon transmission due to cable capacitance thereby causing the pulses received to be rounded and have relatively long rise and fall times. This effect on and distortion of pulse height and shape materially affects pulse height analysis and decay time analysis in conventional radioactive well logging.

For example, in the production of a radiation energy spectrum or the measurement of radiation intensity within a particular energy range, the electrical pulses generated downhole have heights proportional to the energy of the radiation detected. It is desirable to transmit these pulses to recording systems at the surface which select the pulses according to height to produce an energy spectrum or to obtain intensity measurements of radiation detected at a particular energy range of interest. In such a system, the pulses not only must be transmitted at a high frequency but must be transmitted without distortion of or effect on pulse height, since the distortion destroys the linear relationship between energy and pulse height. If the received pulses no longer have heights proportional to the energy of the radiation detected, the selection of pulses according to height is meaningless.

In decay time analysis, radiation decay and lifetimes are measured by periodically irradiating the formations with pulses of primary radiation. The resulting secondary radiation after each pulse is detected, for example, for the production of decay curves. A trigger pulse is generated at the beginning or end of each pulse of primary radiation. In the production of accurate decay curves, the time interval that the radiation is detected, following the generation of the trigger pulse, is critical. If the trigger and detector pulses are transmitted to the surface over the conventional cables, however, material inaccuracies will result due to distortion of pulse height and shape for the following reasons.

Instrumentation must be employed at the surface which includes a fixed threshold device to detect the pulses above the noise level. To accurately determine the time of occurrence of the received detector pulses relative to the trigger pulses, the pulses received must have sharp rise times. The attenuation of the high frequency components of the pulses, however, cause the pulses received to be rounded and to have relatively long rise times. The response of the threshold device to such a pulse therefore may be delayed significantly from the start of the pulse. Moreover, since the noise level from pulse to pulse is not constant and the pulses may be of different heights, the pulses received will reach the threshold level at different times and the threshold device will respond to the pulses at different times following the start of each pulse. Therefore, inaccuracies result in the determination of the time of occurrence of the received detector pulses relative to the trigger pulses.

In accordance with the present invention, there is provided an improved well logging system for and method of transmitting intelligence signals by way of at least one electrical conductor from the borehole to the surface. In the system of the present invention, the distortion of pulse height and shape does not present the problems mentioned previously, thereby allowing conventional and readily available well logging cables to be employed.

The system, in one embodiment, comprises a logging tool including an energy source for applying energy to the formations of interest. Detecting means spaced from the source is provided for detecting a resulting phenomenon having characteristic parameters of interest dependent upon the formations adjacent the borehole. Means is provided for producing timing functions at a substantially constant frequency. A signal producing means responsive to the phenomenon detected and to the timing functions selectively forms an intelligence signal from a plurality of the timing functions proportional in number to the magnitude of at least one parameter which characterizes the phenomenon. The intelligence signal includes a plurality of electrical pulses representative of the parameter of interest. Only electrical pulses forming each intelligence signal are impressed on the conductor for transmission to the surface. Means is provided at the surface responsive to the plurality of pulses transmitted for indicating variations of the parameter of interest dependent upon the formations adjacent the borehole.

The intelligence signal produced and impressed upon the conductors for transmission to the surface may be in binary or digital form. A binary scaler is employed downhole to generate the signals in binary form. These signals may comprise a series of electrical pulses of positive and negative polarity which form a binary number representative of the magnitude of the parameter to be measured. The binary functions from the plurality of binaries may be simultaneously impressed on a plurality of conductors for transmission of the binary information to the surface in a minimum of time.

The electrical pulses which comprise the binary signals are transmitted over the cable conductors to the surface where they may be registered in a register of a recording system for the production of the desired logs. In radioactive well logging the intelligence signals, whether in binary or digital form, may be representative of pulse height and therefore representative of the energy of the radiation detected. The height of the pulses transmitted over the cable and comprising the binary or digital signals, however, is not proportional to the energy of the radiation detected. Therefore, the height of the pulses received at the surface is not critical and distortion of pulse height does not affect the measurements as it does in the systems previously discussed. In the case of intelligence signals in binary form, the series of electrical pulses forming each signal are either positive or negative and are thus readily distinguishable one from the other. The magnitude of the radiation detected thus can be accurately registered at the surface for the production of the desired logs.

In the production of well logs which reflect radiation decay and lifetimes, the time interval that the radiation is detected following each pulse of primary radiation also may be converted downhole to intelligence signals in binary form. These signals also may comprise a series of electrical pulses of positive and negative polarity which are impressed on the cable conductors for transmission to the surface. At the surface, the time of occurrence of the received detector pulses relative to the trigger pulses is no longer critical and distortion of pulse height and shape has little if any effect on the measurements. As in the case of pulse height analysis in well logging, the received series of positive and negative pulses which form each signal are readily distinguished one from the other. The series of pulses which comprise the binary signal thus may be accurately registered in a register of a recording system for the production of the desired logs.

In decay time analysis, the recording system may include a conventional multichannel pulse height analyzer, which, in accordance with another aspect of the present invention, is readily converted to a multichannel time analyzer.

In addition, in the radioactive well logging system of the present invention, binary information representative of both time and pulse height may be produced downhole and transmitted to the surface. At the surface, the two types of binary informations are employed to produce logs which reflect the intensity of radiation detected within a particular energy range and within a certain time interval after each pulse of primary radiation.

For further objects and advantages of the present invention and for a more complete understanding thereof, reference may be made now to the following detailed description taken in conjunction with the accompanying drawings.

Figure 1:
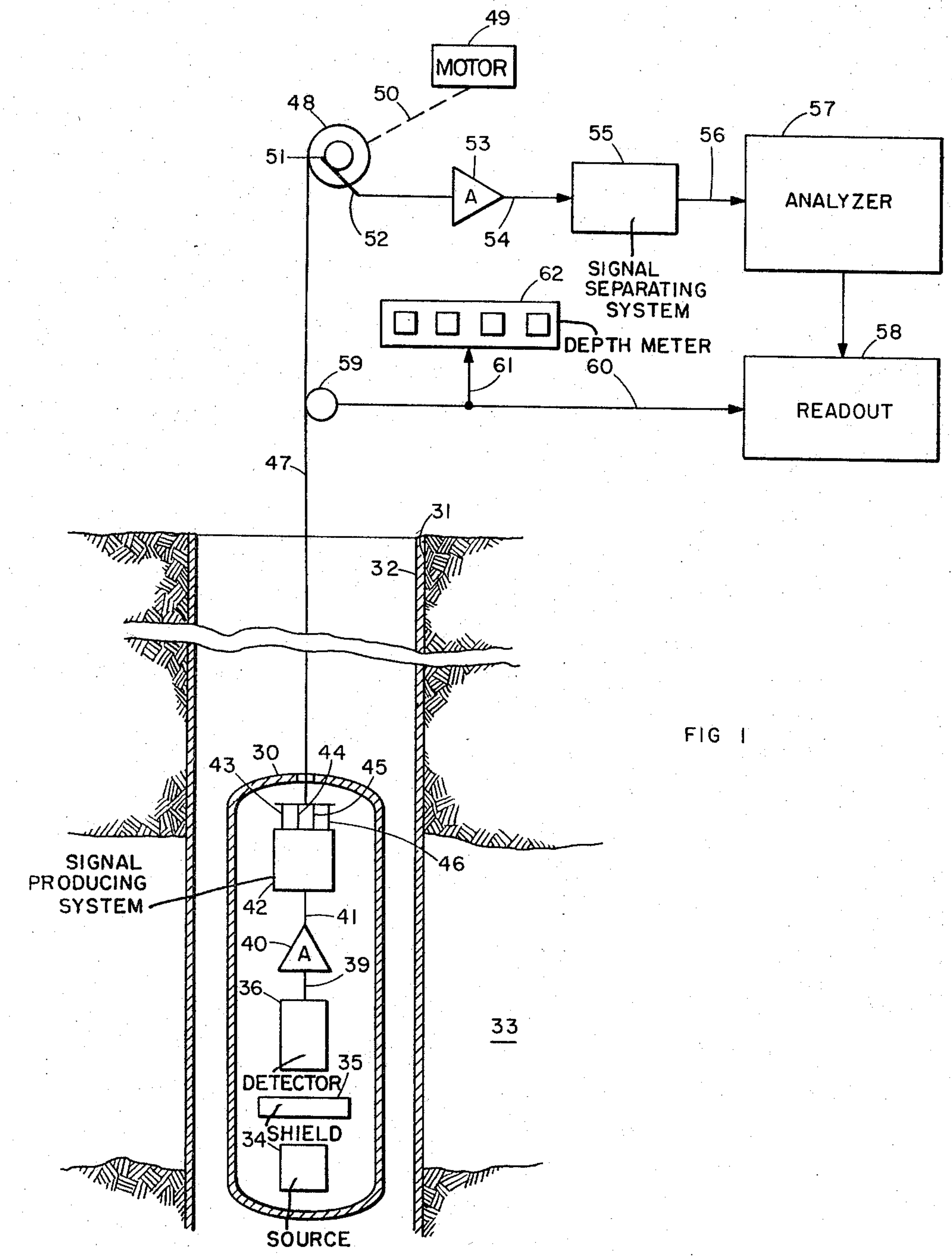
FIGURE 1 represents a general embodiment of the well logging system of the present invention.

Referring now to FIGURE 1 of the drawings, there is disclosed a general system for carrying out the well logging process of the present invention. A well logging instrument 30 is provided for traversing a borehole 31 which may be lined with an iron casing 32. The logging instrument 30 is supported in the borehole by a cable 47 which is wound and unwound upon a drum 48. A motor 49 drives the drum 48 by way of mechanical connection 50 to move the instrument 30 through the borehole to obtain information about the characteristics of the formation 33.

The instrument 30 is provided with an energy source 34 for applying energy to the formations. Also provided in the instrument 30 is a detector 36 for detecting a resulting phenomenon having characteristic parameters of interest dependent upon the formations adjacent the borehole 31.

The logging instrument 30 may be used in various applications to obtain different types of information about the formation 33. The type of source 34 and detector 36 employed in the logging instrument 30 will vary dependent upon the type of information desired to be obtained. For example, the source 34 may be a radioactive source and the detector 36 may be a radiant energy detector. In this case, a shield 35 is positioned between the source and the detector to shield the detector from direct radiation emitted by the source. Signals from the detector 36 are applied, by way of conductor 39, to an amplifier 40, the output of which is applied by way of conductor 41 to a signal producing system 42. This system, in the preferred embodiment, comprises a binary scaler which generates an intelligence signal in binary form comprising a plurality of functions representative of the magnitude of the parameter to be measured. These binary functions are impressed on the cable conductors, which may include conductors 43–46, for transmission to the surface of the earth. In another embodiment, the system 42 may comprise a means for generating digital functions proportional in number to the magnitude of the parameter to be measured and which are impressed on a cable conductor for transmission to the surface.

At the surface, signals from the conductors of the cable are taken off by a slip ring 51 and brush arrangement 52 of which only one slip ring and brush are shown. These signals are applied to an amplifier 53 and then, by way of conductor 54, to separating system 55. This system acts to separate the signals, for application, by way of conductor 56, to a recording system comprising an analyzer system 57 coupled to a readout 58. For each cable conductor employed for transmitting intelligence information, there will be a separate system 55, including amplifier 53. The system 57 converts the signals transmitted, whether in digital or binary form, to useful information for application to the readout for the production of the desired logs or curves. The system 57 may be a digital-to-analog converter coupled to a single channel pulse height analyzer employed for the production of a continuous trace. In this case, readout 58 is a continuous trace recorder, the chart of which is driven in correlation with depth by a cable measuring element 59 coupled to mechanical connection 60. The system 57 also may be a multichannel analyzer employed for the production of an energy spectrum or decay curve. In this example, readout 58 may be an oscilloscope or an X–Y plotter. The depth at which the logging operations are obtained is read from meter 62 coupled to mechanical connection 60 by way of connection 61.

In the preferred embodiment wherein a binary scaler is employed downhole for the production of intelligence signals in binary form, the analyzing system 57 includes a register for registering the series of functions which make up each binary signal. In radioactive well logging, the binary signals transmitted to the surface may represent the energy of radiation detected, the time of detection of secondary radiation following the irradiation of the formations with pulses of primary radiation or a combination of both.

There first will be described a radioactive well logging system for generating, in the borehole tool, binary signals representative of the energy of the radiation detected for transmission over the cable conductors to the register of the recording system at the surface. In the operation of this system, electrical pulses are first produced downhole having a height proportional to the energy of the radiation detected. The height of these pulses is broken down into digital information, which in turn is applied to the binary scaler in the borehole tool for the production of signals in binary form.

In the description of this system, reference will be made to FIGURES 2–5. The borehole instrumentation, illustrated in FIGURE 2, first will be described. The instrumentation includes a radioactive source 34, for irradiating the formations with primary radiation. This source may be a capsuled source, such as a plutonium-beryllium source, or a pulsed neutron source as will be described hereinafter. Shielded from the source by shield 35 is a detector 36 which may comprise a sodium iodide scintillation crystal 37 coupled to a photomultiplier tube 38. The photomultiplier tube 38 converts the scintillations produced in crystal 37 to electrical pulses having a magnitude proportional to the energy of the radiation detected. The radiation of interest may be neutron-capture gamma rays produced by irradiating the formations with fast neutrons emitted from the source. The pulses from the photomultiplier tube 38 are applied by way of conductor 39, amplifier 40, and conductor 41 to a system for converting the height of the pulses to signals in binary form.

This system comprises the block diagram circuits illustrated in the dotted line 80, oscillator 84, binary scaler comprising binaries $B_1$–$B_7$, the block diagram circuits illustrated in the dotted line 99, clock frequency source 100, and the block diagram circuits illustrated in the dotted lines 144 and 157. The system is divided in this manner for convenience of description. The circuits illustrated in dotted line 80 along with oscillator 84 convert the height of each pulse applied from conductor 41 into digital information. This digital information is applied to the binary scaler comprising seven binaries $B_1$–$B_7$ connected together in cascade. The seven binaries, which have 128 possible states, each produce an output of negative or positive polarity dependent upon which state each binary is in, which in turn is dependent upon the digital information applied to the binaries. The circuits illustrated in dotted line 99 act sequentially to select certain pulses from clock frequency source 100 to control the application of the output from each binary to the cable conductors.

Three systems 144 (only one of which is shown) and system 157 are employed to apply the pulses from the binaries to the cable conductors. These systems include bipolar "AND" gates which employ the selected pulses from clock frequency source 100 to pass the output from each binary to the conductors, whether the output is positive or negative.

Figure 2:
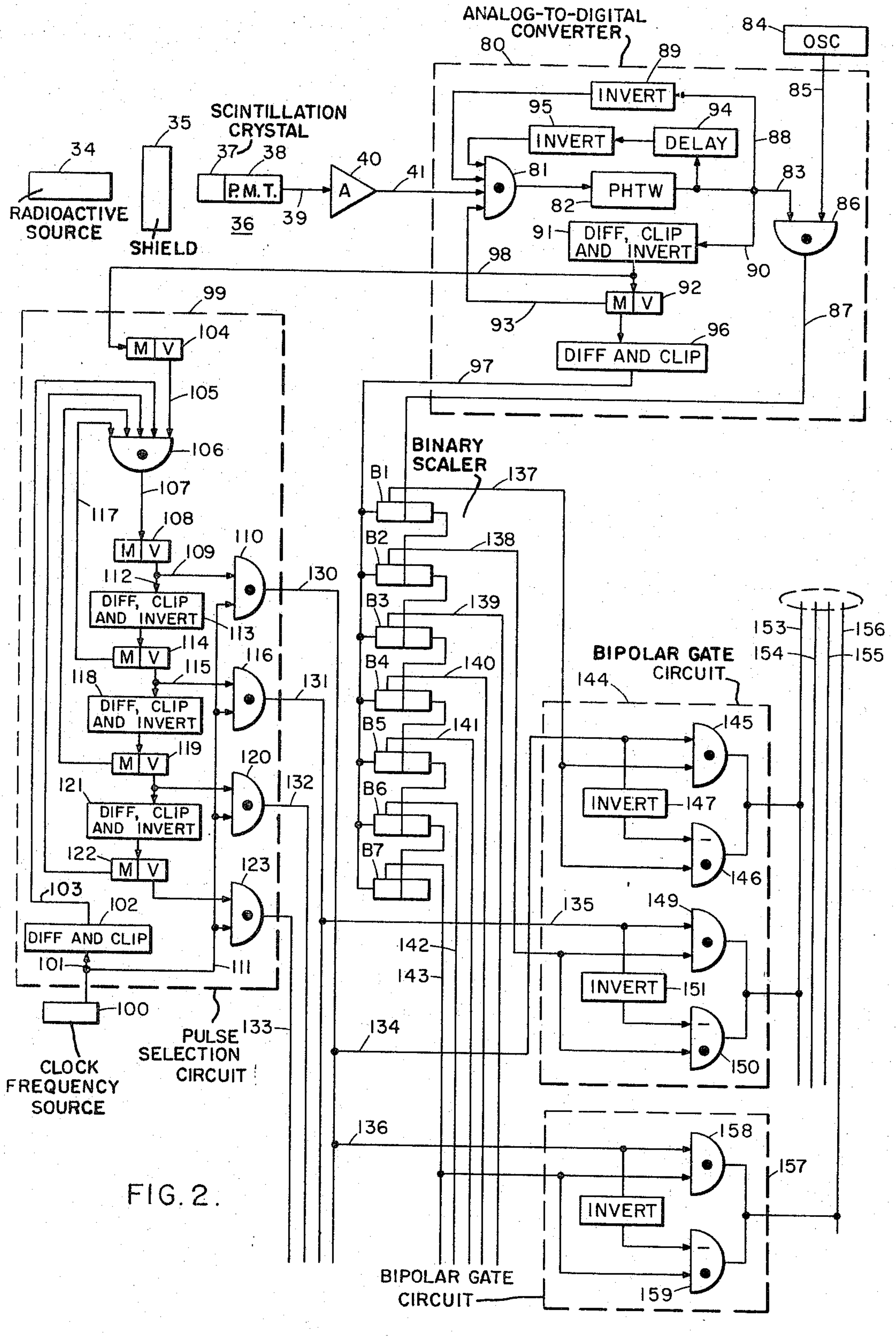
FIGURE 2 illustrates a borehole system for converting pulse height into binary information.

In the embodiment of FIGURE 2, four cable conductors 153–156 of a conventional six conductor cable are utilized to transmit the binary information to the surface. The output of the seven binaries is applied to the cable conductors in the following manner: $B_1$ and $B_2$ to conductor 153, $B_3$ and $B_4$ to conductor 154, $B_5$ and $B_6$ to conductor 155, and $B_7$ to conductor 156. In this manner, the series of pulses which comprise each signal simultaneously are transmitted to the surface over a plurality of conductors, thus transmitting each signal in a minimum of time.

Figure 5:
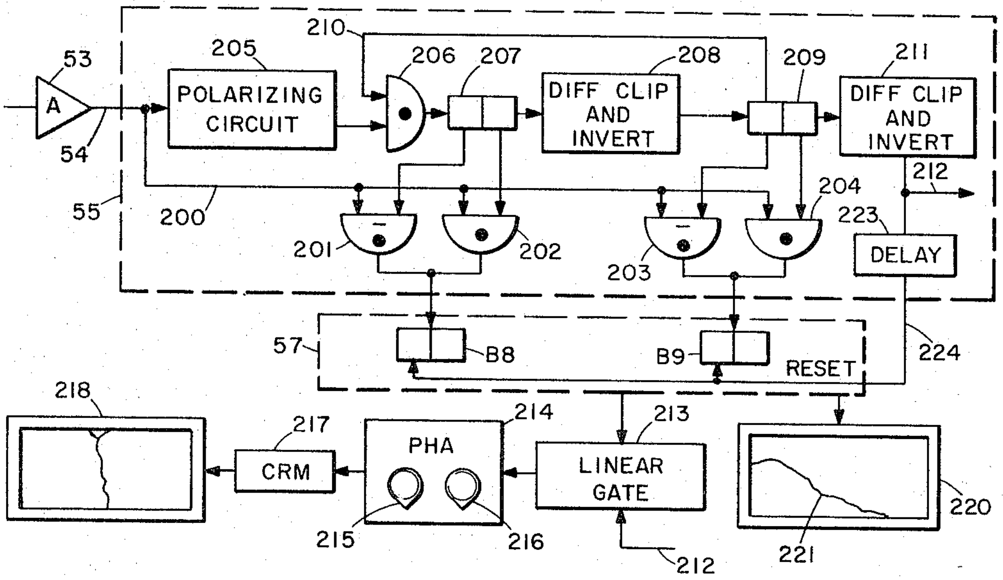
FIGURE 5 illustrates surface instrumentation for registering binary information transmitted over the cable to the surface.

At the surface, referring briefly to FIGURE 5, a system illustrated by dotted line 55 is coupled to each conductor utilized for transmitting binary information. Each system 55 separates the pulses transmitted over the conductor for application to the uphole analyzer system 57, which may include a plurality of binaries.

There now will be described more specifically the manner in which the system 80 and oscillator 84 operate to convert pulse height into digital information. The pulses from conductor 41 are applied to pulse height-to-width converter 82 by way of positive "AND" gate 81. For convenience of understanding, in the figures, positive "AND" gates are marked with a dot and negative "AND" gates are marked with a dot and a minus sign (∸). The pulse height-to-width converter 82 produces a positive output pulse having a width proportional to the height of the pulse applied thereto. These circuits are well known in the art, the principle of operation of one type being described by D. H. Wilkinson, Proceedings of the Cambridge Philosophical Society, vol. 46, p. 508 (1950). The outputs of the photomultiplier tube 38 and the converter 82 may be that as illustrated respectively in FIGURES 3*a* and 3*b*. The output of the pulse height-to-width converter 82 is applied by way of conductor 83 to an "AND" gate 86. Also applied to gate 86 is the output of the oscillator 84 which may be a one-megacycle oscillator. The output of gate 86, illustrated in FIGURE 3*d*, is thus a plurality of pulses whose number is proportional to the height of the pulse produced by the photomultiplier tube 38. As an example, the maximum height of the pulse produced and applied to converter 82 may be 10 volts. The system, including converter 82, is adjusted in response to this pulse to produce a pulse having a width sufficient to allow 128 pulses from oscillator 84 to pass gate 86 to be counted by the binary scaler. Thus, the maximum pulse height is broken down in to 128 parts thereby giving a resolution of better than 1% of maximum pulse height.

Figure 4:
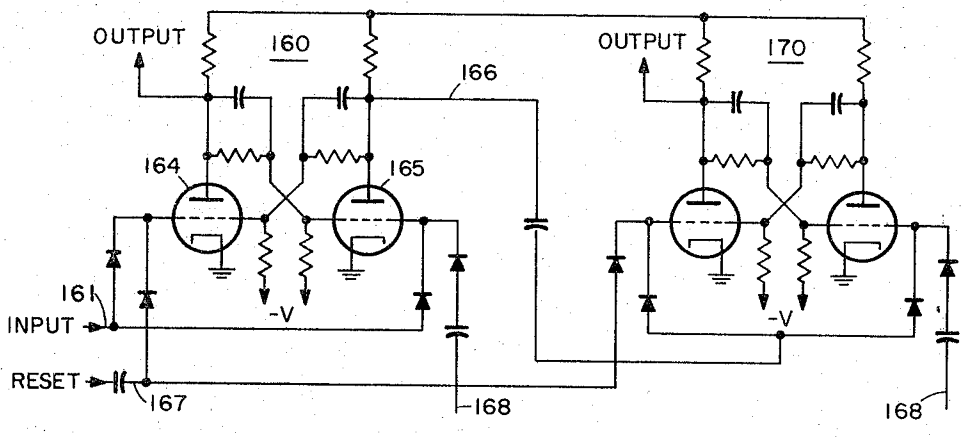
FIGURE 4 illustrates circuitry employed in the embodiments of the present invention.

Binary scalers are well known in the art and may be comprised of a series of bistable multivibrators formed from vacuum tubes or transistors. An example of the former is illustrated in FIGURE 4. In this example, only two binaries 160 and 170 are illustrated. At the outset, the left tubes are conducting and the right tubes are off. A positive input pulse, applied by way of conductor 161, will flip the binary 160 to its other state. The positive pulse will bring the right tube 165 into conduction but will not affect the left tube 164 since it is already in saturation. Binary 170 is not affected by the first pulse. A second positive pulse causes binary 160 to flip again thereby producing a positive output at the plate of the right stage. This output is applied by way of conductor 166 to flip binary 170. The signal in binary form may be said to comprise a series of "1" or "0" bits which appear respectively as positive and negative potentials taken from the left stage of each binary. Referring again to FIGURE 2, the outputs from the left stages of the binaries are applied to the cable conductors by way of conductors 137–143. The binaries may be reset by a positive pulse applied to conductor 167 shown in FIGURE 4.

Gate 81 (FIGURE 2) is blocked during the time interval that the pulse height-to-width converter 82 is producing an output pulse and during the time interval that the binary functions are being impressed upon the cable conductors. Gate 81 rejects pulses during these time intervals to prevent pulses from detector 36 from interfering with the operation of the system during the analysis or conversion of a previous pulse.

To block the gate 81 during the time that the converter 82 is busy, the positive output of the converter 82 is applied by way of conductor 83 to the inverter 89 for the production of a negative pulse. This negative pulse is applied back to gate 81. The gate 81 is blocked during the second time interval mentioned above in the following manner. The output of converter 82 is applied, by way of conductor 90, to circuit 91. This circuit differentiates the positive pulse from converter 82 and clips the leading positive peak. The trailing negative peak is inverted to produce a positive pulse, illustrated in FIGURE 3*e*, and applied to trigger monostable multivibrator 92. This positive peak also is applied by way of conductor 98 to trigger monostable multivibrator 104, as will be described hereinafter. At the outset, the left and right stages of multivibrator 92 produce positive and negative outputs respectively. In one embodiment, this multivibrator may be comprised of two vacuum tubes with a positive trigger pulse being applied to the grid of the left tube. The multivibrator, when triggered, produces at the left stage a negative pulse, illustrated in FIGURE 3*f*, which is applied by way of conductor 93 to block gate 81. The width of this pulse in time is at least as great as the time required to impress binary signals on the cable conductors. In the event that there is a gap between the negative pulses from inverter 89 and multivibrator 92, the output from converter 82 may be delayed at 94, inverted at 95, and applied to block gate 81 during the gap.

The output from the left stage of multivibrator 92 also is utilized to reset the binaries $B_1$–$B_7$. This output is applied to circuit 96 which differentiates the negative pulse and clips the leading negative peak. The trailing positive peak is applied by way of conductor 97 to reset all of the binaries $B_1$–$B_7$.

There now will be described the manner in which the outputs from the binaries $B_1$–$B_7$ are selected for application to the cable conductors. Clock frequency source 100 may comprise a free-running multivibrator that produces pulses which are applied to the system illustrated in dotted line 99. As mentioned above, this system acts to select certain ones of the clock-frequency pulses to aid in applying the binary signals to the cable conductors. Briefly, the first and second of the selected pulses are passed, respectively, by "AND" gates 110 and 116 to the systems illustrated at 144 and 157. The pulses from the source 100 are illustrated in FIGURE 3*g*. When a conventional logging cable is employed, the source 100 may be adjusted to produce pulses having a width of 20 microseconds at time intervals of 120 microseconds. A suitable source for producing such pulses is described on pages 171 and 172 of Waveforms, Chance et al., McGraw-Hill Book Company, Inc., 1949. These pulses are applied by way of conductor 101 to circuit 102 where they are differentiated and the trailing negative-going peaks clipped. The output from circuit 102, illustrated in FIGURE 3*h*, is applied by way of conductor 103 to "AND" gate 106. The output of monostable multivibrator 104 also is applied, by way of conductor 105 to the gate 106. As mentioned above, multivibrator 104 is triggered by the positive-going pulses applied from conductor 98. The output from the right stage of multivibrator 104 when triggered is a positive pulse, illustrated in FIGURE 3*i*, which may have a length in time equal to two cycles (240 microseconds) of the signals produced by source 100. The time of this pulse is the same as that produced by multivibrator 92 and is sufficient to allow only two signals from the source 100 to pass gate 106. The first of these signals is passed by gate 110 and the second is passed by gate 116 to aid in applying the outputs of the binaries $B_1$–$B_7$ to the cable conductors.

The output of gate 106 comprises a positive-going peak, illustrated in FIGURE 3*j*, which is applied by way of conductor 107 to monostable multivibrator 108. The right stage of multivibrator 108, when triggered, produces a positive pulse, illustrated in FIGURE 3*k*. The length in time of this pulse may be of the order of 70 microseconds. This pulse is applied, by way of conductor 109, to open "AND" gate 110 to pass the first of the two selected pulses from source 100. The output from source 100 is applied to gate 110 by way of conductor 111. It is to be noted that the output from source 100 also is applied to "AND" gates 116, 120, and 123. The output of gate 110, illustrated in FIGURE 3*l*, is applied by way of conductor 130 to systems 144 and 157.

To open gate 116 for the passage of the second selected pulse from source 100, the positive output of the multivibrator 108 also is applied to circuit 113. This circuit differentiates the pulse, clips the leading positive peak, and inverts the trailing negative peak. The output from circuit 113, illustrated in FIGURE 3*m*, is applied to trigger monostable multivibrator 114. When triggered, the right and left stages of this multivibrator, respectively, produce positive and negative pulses, the length in time of which may be of the order of 120 microseconds. The positive pulse, illustrated in FIGURE 3*n*, is applied by way of conductor 115 to open "AND" gate 116, thereby allowing the second selected pulse from source 100 to pass the gate. The negative pulse from multivibrator 114 is applied by way of conductor 117 to block gate 106 during the time that multivibrator 114 produces an output. This prevents multivibrator 108 from being triggered by the second pulse from source 100. If it is desired to impress the output from three or four binaries on a single conductor, the remaining circuits 118, 119, 120, 121, 122, and 123 may be utilized as will be described hereinafter.

There now will be described the manner in which systems 144 and 157 operate to impress binary signals on the conductors of the cable. System 144 includes two bipolar gates which comprise two sets of "AND" gates for applying the output from two binaries on a single conductor. If four conductors are utilized for transmitting binary information, three bipolar gate systems similar to 144 will be employed for applying the output from six binaries to three conductors. A fourth system 157, comprising one set of "AND" gates, is utilized for impressing the output of the seventh binary on the fourth conductor.

Referring to system 144, the first set of "AND" gates comprises positive "AND" gate 145 and negative "AND" gate 146. The second set also includes a positive "AND" gate 149 and a negative "AND" gate 150. The output from binary $B_1$ is applied by way of conductor 137 to the first set of "AND" gates and the output of binary $B_2$ is applied by way of conductor 138 to the second set of "AND" gates. The output from gate 110, which comprises the first of the two signals selected from source 100, is applied by way of conductors 130 and 134 to the gate 145, inverted at 147, and applied to the gate 146. Correspondingly, the output of gate 116, which comprises the second of the two signals selected from source 100, is applied by way of conductors 131 and 135 to gate 149, inverted at 151, and applied to gate 150. Gate 145 passes the output from binary $B_1$ if it is positive while gate 146 passes the output if it is negative. Gates 149 and 150 operate in a similar manner to apply signals from binary $B_2$ on the same cable conductor 153. The signals from binaries $B_1$ and $B_2$ impressed upon cable conductor 153 may be that as illustrated in FIGURE 3*p*.

As mentioned above, two other systems (not shown) similar to 144 are employed to apply the outputs of binaries $B_3$–$B_6$ on cable conductors 154 and 155. Each of these systems is coupled to gates 110 and 116 as is system 144. The fourth system 157 applies the output of binary $B_7$ to cable conductor 156, gates 158 passing positive signals and gate 159 negative signals.

As now can be well understood, the outputs of binaries $B_1$–$B_7$, in the form of a series of negative and positive pulses, are impressed upon the cable conductors for transmission to the surface. At the surface, the negative or positive pulses are registered in a register included in the recording system comprising analyzer 57.

Referring now to FIGURE 5, there will be described the surface system for separating the binary functions from the cable conductors for application to the register of the recording system. The register may comprise seven binaries each employed to register one of the seven binary functions which make up each binary signal. For example, the binaries illustrated in FIGURE 4 may be employed as registers by disconnecting conductor 166 and applying positive input pulses to conductors 168. The outputs taken from the left stage of each binary are applied to produce the desired logs as will be described hereinafter.

A separate system 55 including amplifier 53 is coupled to each cable conductor utilized for transmitting binary information to the surface. If four cable conductors are utilized, as previously described, four systems 55, including appropriate amplifiers 53, will be employed. Three of the systems will separate the signals from the three conductors 153–155 for application to six binaries and the fourth will apply the signal from conductor 156 to the seventh binary. The system 55, illustrated, acts to separate the two signals from one of the cable conductors, for example, conductor 153, for application to binaries $B_8$ and $B_9$, which act as registers.

More particularly, signals from amplifier 53 are applied by way of conductors 54 and 200 to gates 201–204. The output of amplifier 53 also is applied to circuit 205 which converts the binary signals, whether positive or negative, to positive signals. This circuit is called a polarizing circuit. Such systems are well known in the art, one type being illustrated on page 133 of Electronic Design, vol. 8, No. 7, Mar. 30, 1960. The output of circuit 205, illustrated in FIGURE 3*q*, is applied to "AND" gate 206. The output of this gate in turn is applied to trigger monostable multivibrator 207. When triggered, the right stage produces a positive output and the left stage produces a negative output. The length in time of the output pulses produced is the same as that of the pulses produced by multivibrator 108 of FIGURE 2. The positive pulse, illustrated in FIGURE 3*r*, is applied to gate 202 and the negative pulse is applied to gate 201. Gate 201 passes the first pulse or signal on conductor 200 if it is negative, while gate 202 passes the pulse if it is positive.

The positive output taken from the right stage of multivibrator 207 is utilized to apply the second pulse on conductor 200 to binary $B_9$. This positive output is applied to circuit 208 which differentiates the pulse, clips the leading positive peak, and inverts the trailing negative peak. The positive output pulse from circuit 208, illustrated in FIGURE 3*s*, is applied to trigger monostable multivibrator 209, which is similar to multivibrator 207, except the output pulses may be of the order of 120 microseconds. The positive output from the right stage, illustrated in FIGURE 3*t*, is applied to gate 204 and the negative output from the left stage is applied to gate 203. Gate 204 passes the second signal on conductor 200 if it is positive while gate 203 passes the signal if it is negative. The signals applied to binaries $B_8$ and $B_9$ may be that illustrated in FIGURE 3*u*. The negative pulse from the left stage of multivibrator 209 is applied by way of conductor 210 to block gate 206. This prevents the second binary signal from triggering multivibrator 207. The fourth system for applying the single binary signal from conductor 156 to the seventh uphole binary is similar to system 55, except that only one set of "AND" gates, 201 and 202 is employed.

The analyzing system 57 may be a multichannel pulse height analyzer employed to produce an energy spectrum 221 on the readout 220. This analyzer includes a plurality of channels wherein radiation intensity is stored and counted depending upon the energy of the radiation. Normally the analyzer includes means for converting pulse height to digital information which is applied to a binary scaler. The scaler has a certain number of possible states, each state being unique to a particular channel which, in turn, comprises a certain group of magnetic cores. Counts or events are stored in a particular channel corresponding to a particular setting of the binaries. In the normal operation when digital information has been applied to the binary scaler and a proper address has been set up, the analyzer produces a command signal for initiating the storage of information. In the embodiment of the present invention, binary information is transmitted from the surface to the seven registers, the outputs of which are applied to the analyzer memory for the production of the desired spectra.

An initiate storage pulse is obtained from one of the three systems 55 employed to separate two binary functions from one cable conductor. This pulse is applied after the binary functions from the four cable conductors have been registered and is obtained from circuit 211. More particularly, the positive output pulse from the right stage of multivibrator 209 is applied to circuit 211 which differentiates the pulse, clips the leading positive peak, and inverts the trailing negative peak. This pulse, illustrated in FIGURE 3*v* and taken from conductor 212, is applied to initiate storage of the analyzer memory. This pulse also is delayed at 223 and applied by way of conductor 224 to reset the binaries of the register.

The output of each channel, which is representative of the intensity of the radiation detected at a certain energy level, is converted to an analog signal and applied to readout 220 for the production of the spectrum 221.

If it is desired to produce a continuous trace representative of the intensity of the radiation detected within a particular energy range, the system 57 employed may be a conventional digital-to-analog converter for converting binary signals to analog signals and which is coupled to a single channel pulse height analyzer 214 and a continuous trace recorder 218. The converter comprises a plurality of binaries which, in the embodiment of the present invention, are employed as registers for registering the binary signals transmitted to the surface. The output of the binaries is converted to a D.-C. voltage proportional in magnitude to the binary number registered. This output is applied to a linear gate 213, which when triggered by the pulse from conductor 212, produces an output pulse having a height proportional to the binary number registered, and therefore proportional to the energy of the radiation detected. These pulses are selected according to height by adjustment of lower threshold control 215 and window width control 216 of analyzer 214. The output of analyzer 214 is applied to count rate meter 217 and then to recorder 218 for the production of a continuous trace representative of the energy of the radiation detected within the desired energy range. The registers of the digital-to-analog converter are reset by the delayed pulse from circuit 211 as described previously. The linear gate 213 may be of the type illustrated on page 436 of Pulse and Digital Circuits, Millman-Taub, McGraw-Hill Book Company, Inc., 1956.

Figure 3:
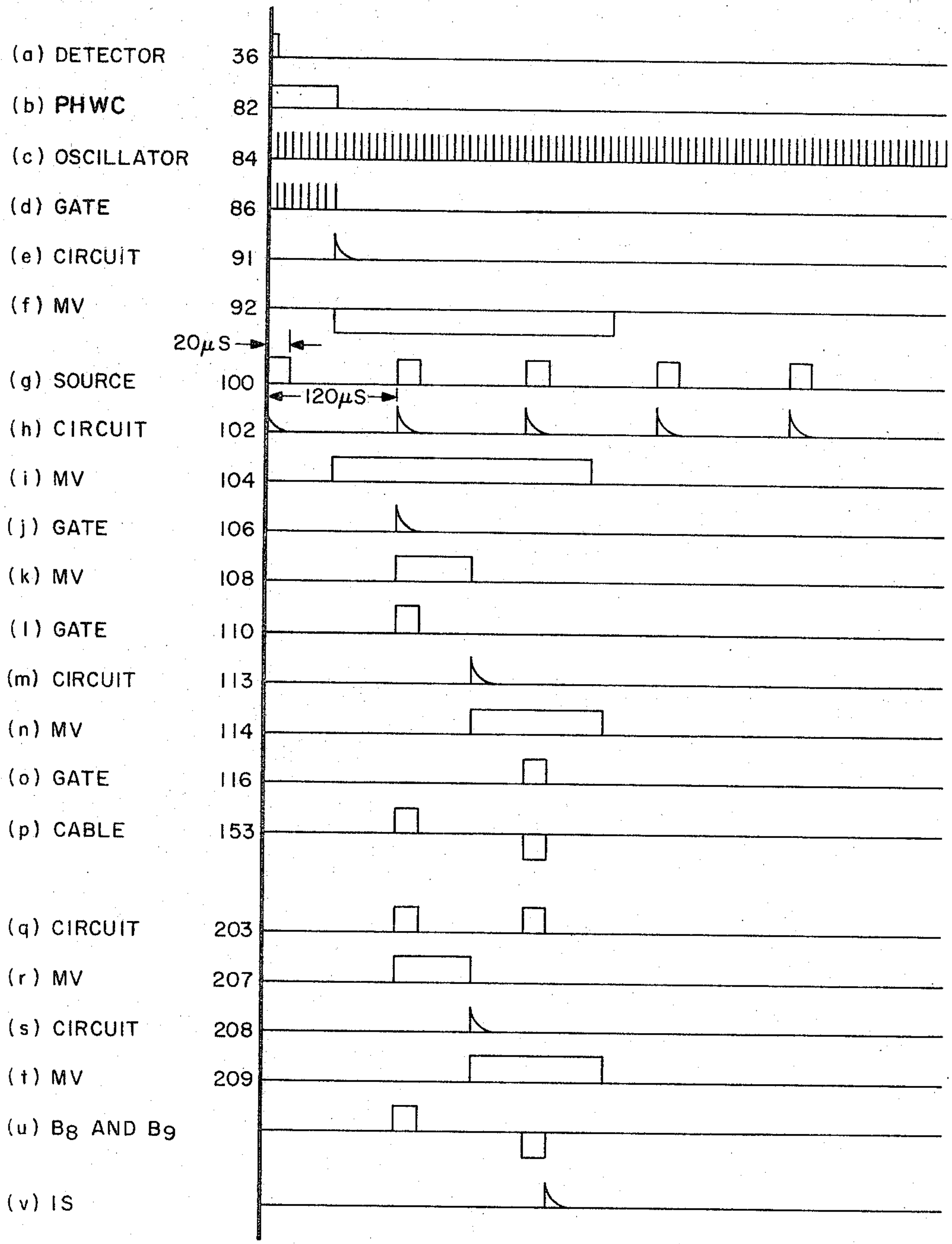
FIGURE 3 illustrates a timing diagram useful in understanding the system of FIGURE 2 and FIGURES 4 and 5.

In the embodiment of FIGURES 2–4, the output of the downhole binary scaler was applied to four cable conductors; however, it is to be understood that the output could be applied to a different number of conductors. For example, the output from the seven downhole binaries may be applied to a single cable conductor or to two cable conductors. In the latter example, which is employed in the embodiment of FIGURES 13–15, the output of four binaries may be applied to one cable conductor and the output of three binaries applied to the second cable conductor. Two bipolar gate systems are employed, a first comprising four sets of "AND" gates with each set being coupled to a separate binary and the second comprising three sets of "AND" gates with each set being coupled to a separate binary.

Referring to FIGURE 2 for further description of the embodiment wherein the outputs of seven binaries are applied to two conductors, multivibrators 92 and 104 are adjusted to produce output pulses equal in time at least to the time required to impress the output of four binaries on a single cable conductor. Four sequential pulses from source 100 are selected. Gate 110 passes the first of these pulses, gate 116 the second, gate 120 the third, and gate 123 the fourth.

As can be readily understood, the positive output of multivibrator 114 is applied to circuit 118 to trigger monostable multivibrator 119. The positive output of this multivibrator opens gate 120 to allow passage of the third signal from source 100. This positive output additionally is applied to circuit 121 to trigger monostable multivibrator 122. The positive output of this multivibrator in turn opens gate 123 to allow passage of the fourth signal from source 100. The negative outputs from multivibrators 119 and 122 are applied to block gate 106. Each of gates 110, 116, 120, and 123 is coupled separately to one of the four sets of "AND" gates of the first bipolar gate system, and each of gates 110, 116, and 120 is coupled separately to one of the three sets of "AND" gates in the second bipolar gate system.

Figure 6:
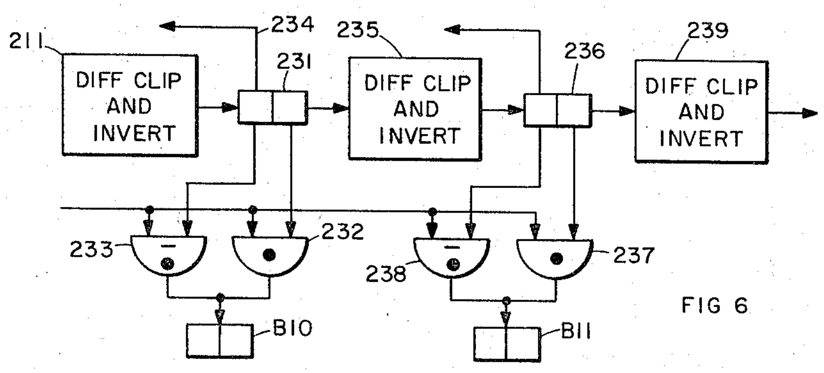
FIGURE 6 illustrates a modification of the system of FIGURE 5.

At the surface, two separating systems 55 of FIGURE 5, modified by that of FIGURE 6, are employed to apply the binary signals from the two conductors to the seven binaries of the analyzer. In FIGURE 6, like elements have been given like reference characters as that illustrated in FIGURE 5. The output from circuit 211 is employed to trigger monostable multivibrator 231 instead of being used as an initiate storage pulse and for resetting the binaries. Multivibrator 231 acts to open gates 232 and 233 to allow passage of the third binary signal to binary $B_{10}$. The negative output pulse from the left stage of multivibrator 231 is applied by way of conductor 234 to block gate 206, shown in FIGURE 5. The output from the right stage is also applied to circuit 235 to trigger monostable multivibrator 236. This multivibrator acts to open gates 237 and 238 to allow passage of the fourth signal to binary $B_{11}$. The negative output from the left stage of multivibrator 236 is applied to block gate 206 while the output from the right stage is applied to circuit 239 for the production of an initiate storage pulse and for resetting the binaries. For the cable conductor which transmits only three binary signals, circuits 235–239 are not employed in the second separating system.

In addition to the radiation measurements described above wherein the energy of the radiation detected is of prime importance, present day logging techniques increasingly are being employed to obtain information about the decay characteristics of the formations or of the elements contained therein.

Figure 11:
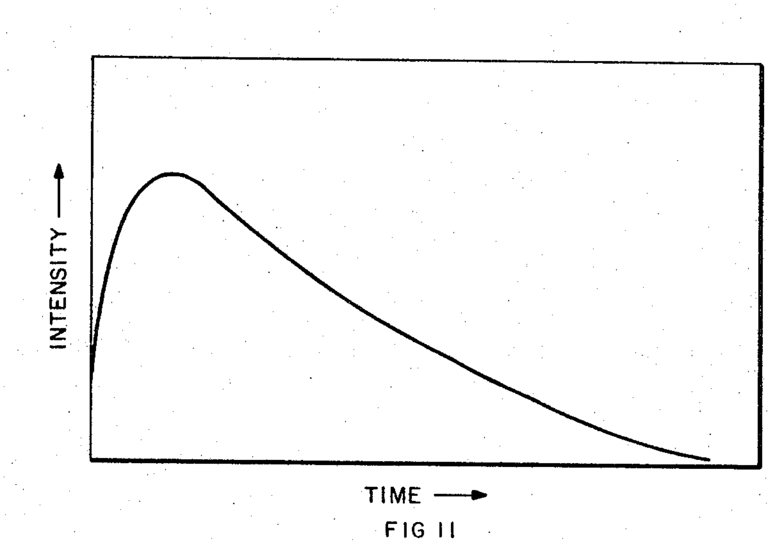
FIGURE 11 illustrates a decay curve useful in understanding the present invention.

To obtain such information, a curve such as that illustrated in FIGURE 11 may be produced. This curve may represent the decay of thermal neutrons in the formations or the decay of radioactive isotopes, for example, by the emission of gamma rays. A thermal neutron decay curve, for example, is of interest since the slope thereof gives information about the thermal neutron-capture cross section of the elements in the formations. To obtain such a curve, the formations periodically are irradiated with pulses of fast neutrons and thermal neutrons are detected after each pulse. As the fast neutrons enter the formations, they will be slowed to the thermal energy. Some of them will diffuse through the formations to the detector and others will be captured by the elements in the formation. As the time increases after each pulse of neutrons, more thermal neutrons will have been captured and less will be detected. The curve of FIGURE 11 thus reflects the manner in which the thermal neutrons in the formations decay or are captured by the elements. As understood by those versed in the art, the rate of decay is dependent upon the thermal neutron-capture cross section of the elements.

In accordance with another embodiment of the present invention, a system is provided for obtaining logs which accurately reflect the intensity of radiation detected at certain time intervals after the beginning or end of each pulse of radiation.

A binary scaler is employed downhole for generating an intelligence signal in binary form which is representative of the time interval of the detection of secondary radiation following the beginning or end of each pulse of primary radiation. This binary information is impressed on the cable conductors for transmission to the surface where it is registered in a recording system. This system may comprise a conventional multichannel pulse height analyzer. The output of each channel of the analyzer represents the cumulative counts of radiation detected following each pulse of irradiation. In accordance with another aspect of the present invention, a conventional multichannel pulse height analyzer is thus converted to a multichannel time analyzer.

Figures 7, 8:
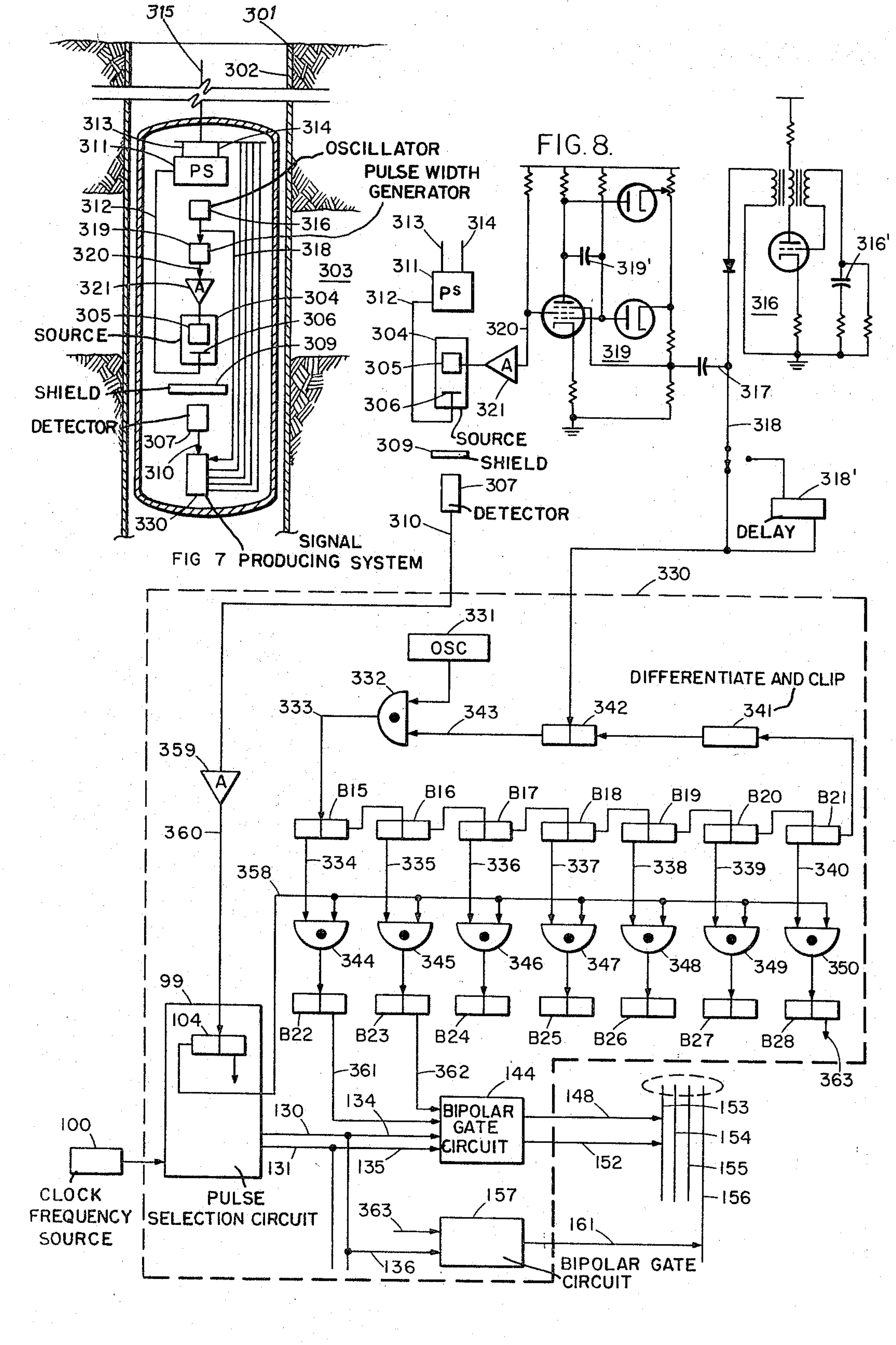
FIGURE 7 illustrates a radiation borehole system for converting time intervals to binary information.
FIGURE 8 illustrates in detail the borehole instrumentation of FIGURE 7.

Referring now to FIGURES 7 and 8, there will be described a borehole system wherein the time intervals mentioned above are converted to signals in binary form which are impressed on the cable conductors for transmission to the surface. The system of FIGURES 7 and 8 employs some of the components of the system of FIGURE 2. Accordingly, like components have been given like reference characters. The systems 55 of FIGURE 5 are employed at the surface to separate the signals from each conductor for application to a register included in the recording system.

Referring first to FIGURE 7, the borehole logging instrument 300 is illustrated as being positioned in a borehole 301 lined with iron casing 302. The formation of interest may be that illustrated at 303. The logging tool comprises a pulsed radiation generator or source 304, which is utilized to periodically irradiate the formations with pulses of radiation. This generator may be a neutron generator which produces fast neutrons by the deuterium-tritium reaction. A detector 307, shielded from direct radiation by shield 309, is utilized to detect secondary radiation during or after each pulse of neutrons. The detector may be a thermal neutron detector comprising a Helium–3 counter. It may be desirable to employ a gamma ray detector instead, however, to obtain information about the decay of elements by the emission of delayed gamma rays as will be described hereinafter. The output of the thermal neutron detector is applied, by way of conductor 310, to system 330. This system converts the time interval occurring between each pulse of neutrons and the detection of thermal neutrons to digital information which in turn is converted into binary information and applied to the cable conductors 153–156 for transmission to the surface of the earth.

A power supply 311 is provided for supplying power to all of the components in the tool, although it is illustrated only as being coupled to generator 304. This power supply is supplied with energizing current by way of conductors 313 and 314 included in cable 315. The neutron generator 304 comprises an ion source 305 of deuterium and a target 306 of tritium. Trigger pulses of positive polarity are periodically applied to the deuterium ion source 305 for ionizing the deuterium. The deuterium ions produced are accelerated to the target 306 by a high negative voltage applied thereto from the power supply 311 by way of conductor 312. The reaction between the deuterium ions and the tritium produces neutrons of energy of 14.3 mev. which then irradiate the adjacent formations.

The system for pulsing the neutron source comprises a blocking oscillator 316 and a phantastron 319, shown in detail in FIGURE 8. These circuits may be of the type illustrated respectively on pp. 207 and 203 of Waveforms, Chance et al., McGraw-Hill Book Company, Inc., 1949. The blocking oscillator produces sharp trigger pulses, illustrated in FIGURE 9*a*, at a predetermined frequency, for example 1000 c.p.s. These pulses are applied by way of conductor 317 to trigger phantastron 319 and by way of conductor 318 to the control circuit 330, as will be described hereinafter. The phantastron produces pulses, illustrated in FIGURE 9*b*, of a predetermined width which are applied by way of conductor 320 and amplifier 321 to the ion source 305 of the neutron generator 304. The frequency and width of the pulses applied to the ion source may be varied by varying the values of the capacitors 316' and 319' respectively of oscillator 316 and phantastron 319 as understood by those skilled in the art.

There now will be described the system 330, of FIGURE 8, for converting to binary information the time interval between each pulse of neutrons from neutron generator 304 and the detection of thermal neutrons. This system is adapted to be employed downhole if conventional logging cables are utilized or may be modified and employed uphole if coaxial cables are available, as will be described hereinafter. In any event, this system readily enables one to convert a conventional multichannel pulse height analyzer to a multichannel time analyzer for efficiently counting a plurality of timing or detection events within the time period between pulses of neutron radiation, as will become apparent from the following discussion. System 330 comprises an oscillator 331, the output of which is applied to "AND" gate 332. This gate is opened at the beginning of each pulse of neutrons and remains open for a time period which ends shortly before the next pulse of neutrons occurs. During this time period, the output of gate 332 comprises a plurality of pulses from the oscillator 331. These pulses are continuously counted in the binary scaler comprising binaries $B_{15}$–$B_{21}$ until they reset themselves shortly before the beginning of the next pulse of neutrons. The outputs of these binaries are applied by way of "AND" gates 344–350 for registration in binaries $B_{22}$–$B_{28}$ until a thermal neutron is detected. When a thermal neutron is detected, gates 344–350 are temporarily blocked and the outputs of binaries $B_{22}$–$B_{28}$ are impressed on the cable conductors. The outputs of binaries $B_{22}$–$B_{28}$ represent the time interval between the trigger pulse from conductor 318 and the detection of individual thermal neutrons. During the time that gates 344–350 are blocked, binaries $B_{15}$–$B_{21}$ continue counting. After the binary functions from binaries $B_{22}$–$B_{28}$ are impressed on the cable conductors, gates 344–350 are opened to allow the cumulative outputs of binaries $B_{15}$–$B_{21}$ to be registered again in binaries $B_{22}$–$B_{28}$ until another thermal neutron is detected. The frequency of oscillator 331 is adjusted so that the binary scaler will have passed through all states and will have reached its reset state before the next trigger pulse from oscillator 316. When the reset state is reached, binary 342 is triggered and gate 332 is blocked. The cycle is then repeated following the next pulse of neutrons from neutron generator 304. Thus, a plurality of detection or timing events between pulses of neutrons from neutron generator 304 may be efficiently counted by the system 330.

A detailed description of the operation of the system 330 of FIGURE 8 now will be given. Trigger pulses produced by blocking oscillator 316 are utilized to open the gate 332. These trigger pulses may be applied directly by way of conductor 318 to trigger bistable multivibrator 342, or may be applied to delay circuit 318' and then to multivibrator 342. At the outset, the output of the left stage of multivibrator 342 is negative, thereby blocking gate 332. When the multivibrator 342 is triggered, the output of the left stage becomes positive, thereby opening the gate 332. The multivibrator 342 is reset by the recycling of the scaler comprising binaries $B_{15}$–$B_{21}$ to close gate 332 at a time shortly before the beginning of the next neutron pulse. Upon recycle the output of binary $B_{21}$ is applied to reset multivibrator 342, as will be described hereinafter.

Figure 9:
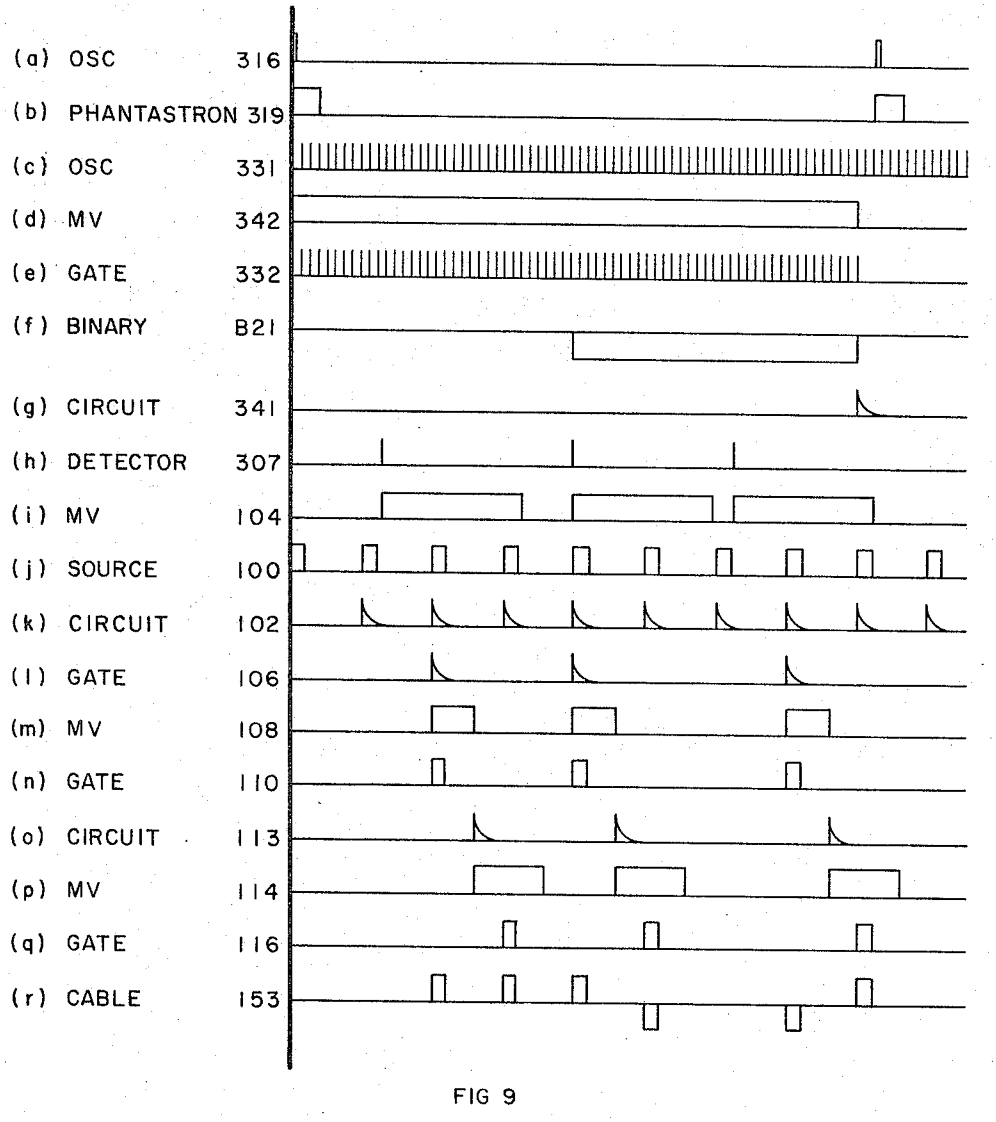
FIGURE 9 is a timing diagram useful in understanding the system of FIGURES 7 and 8.

FIGURE 9*d* illustrates the positive output produced from the left stage of multivibrator 342 when triggered with a pulse from oscillator 316. During the production of this positive output, pulses from the oscillator 331 are applied to the gate 332 and by way of conductor 333 to the binaries $B_{15}$–$B_{22}$. The output of gate 332 is illustrated in FIGURE 9*e*. During the time period that gate 332 is open, binaries $B_{15}$–$B_{21}$ continuously count the timing pulses produced by oscillator 331.

The outputs of each of the binaries $B_{15}$–$B_{21}$ are applied respectively by way of conductors 334–340 to gates 344–350. When these gates are open, outputs of the binaries $B_{15}$–$B_{21}$ are applied to binaries $B_{22}$–$B_{28}$ which act as registers to register the binary number represented by the outputs of binaries $B_{15}$–$B_{21}$.

Monostable multivibrator 104, included in system 99, is employed to open and close gates 344–350. The system 99 is the same as that illustrated in FIGURE 2 with the following exceptions. Multivibrator 104 is triggered by the output of detector 307 and the output from the left stage of multivibrator 104 is applied by way of conductor 358 to gates 344–350. Since the output of the left stage of multivibrator 104 is positive at the outset, gates 344–350 are normally open. When detector 307 detects a thermal neutron, it produces a pulse (three pulses from three detection events being illustrated in FIGURE 9*h*) which is applied by way of conductor 310, amplifier 359, and conductor 360 to trigger multivibrator 104. When multivibrator 104 is triggered, the right stage produces a positive output, illustrated in FIGURE 9*i*, which is employed, as mentioned previously, to impress the outputs of the downhole binaries ($B_{22}$–$B_{28}$ in this case) on the cable conductors. During this time, the negative output of the left stage is applied, by way of conductor 358, to temporarily block gates 344–350. Binaries $B_{15}$–$B_{21}$, however, continue to count pulses from oscillator 331. When multivibrator 104 returns to its stable state, gates 344–350 will be opened and the cumulative output of binaries $B_{15}$–$B_{21}$ will again be registered in binaries $B_{22}$–$B_{28}$ until the next thermal neutron is detected.

The frequency of the oscillator 331 is adjusted in such a manner that the binaries $B_{15}$–$B_{21}$ reset themselves at a time shortly before the beginning of the next neutron pulse from generator 304. The output of the right stage of binary $B_{21}$, illustrated in FIGURE 9*f*, is applied to reset multivibrator 342 to block gate 332 after recycle. To carry out this function, the output pulse of the right stage of binary $B_{21}$ is differentiated at 341 and the leading negative peak clipped. The trailing positive peak then is applied to reset multivibrator 342. The cycle is repeated after the next pulse of neutrons from neutron generator 304. Thus within each cycle, a plurality of pulses, from gate 332, proportional to the time interval that individual thermal neutrons are detected following the application of the trigger pulse to system 330, are converted to binary information which is registered in binaries $B_{22}$–$B_{28}$. This binary information is impressed on the cable conductors as now will be described.

System 99 is utilized to select clock-frequency signals from source 100 in the same manner as described previously to aid in applying the outputs of binaries $B_{22}$–$B_{28}$ on the cable conductors. FIGURES 9*k*–9*r* illustrate the pulses produced by the various circuits of system 99 as discussed previously. As now can be understood, bipolar gate systems 144 are employed to apply the output of binaries $B_{22}$ and $B_{23}$ to conductor 153, the outputs of binaries $B_{24}$ and $B_{25}$ to conductor 154, and the outputs of binaries $B_{26}$ and $B_{27}$ to conductor 155. System 157 is employed to apply the output of binary $B_{28}$ to conductor 156.

At the surface, the same systems 55 described in FIGURE 5 are utilized for selecting the binary functions or pulses from the cable conductors and applying them for registration in the appropriate binaries of the multichannel analyzer. Since the binary information is transmitted by way of four cable conductors, four of the systems illustrated in FIGURE 5 will be utilized as previously discussed.

Instead of being employed for pulse height analysis, the multichannel analyzer 57, shown in FIGURE 5, is now employed for time analysis. The binary information produced, transmitted to the surface, and registered in the binaries of the anlyzer 57 represents the time of thermal neutron detection after each trigger pulse. This binary information, now representing the time of thermal neutron detection, is stored within a particular channel depending upon the number it represents. Therefore, the output of each channel of the analyzer 57 reflects the cumulative number of thermal neutrons detected at a certain time interval following the application of trigger pulses to system 330. The output of the analyzer 57 is applied to readout 220 for the production of a thermal neutron decay curve illustrated in FIGURE 11.

It is to be understood that system 330 of FIGURE 8 may be modified for use at the surface and trigger pulses and detector pulses transmitted to the surface directly over the cables. Satisfactory measurements can be obtained in this manner if coaxial cables are employed. These cables have high frequency characteristics and the distortion of pulse height and shape upon transmission is much less than in the case, for example, of a conventional six-conductor cable.

Figure 10:
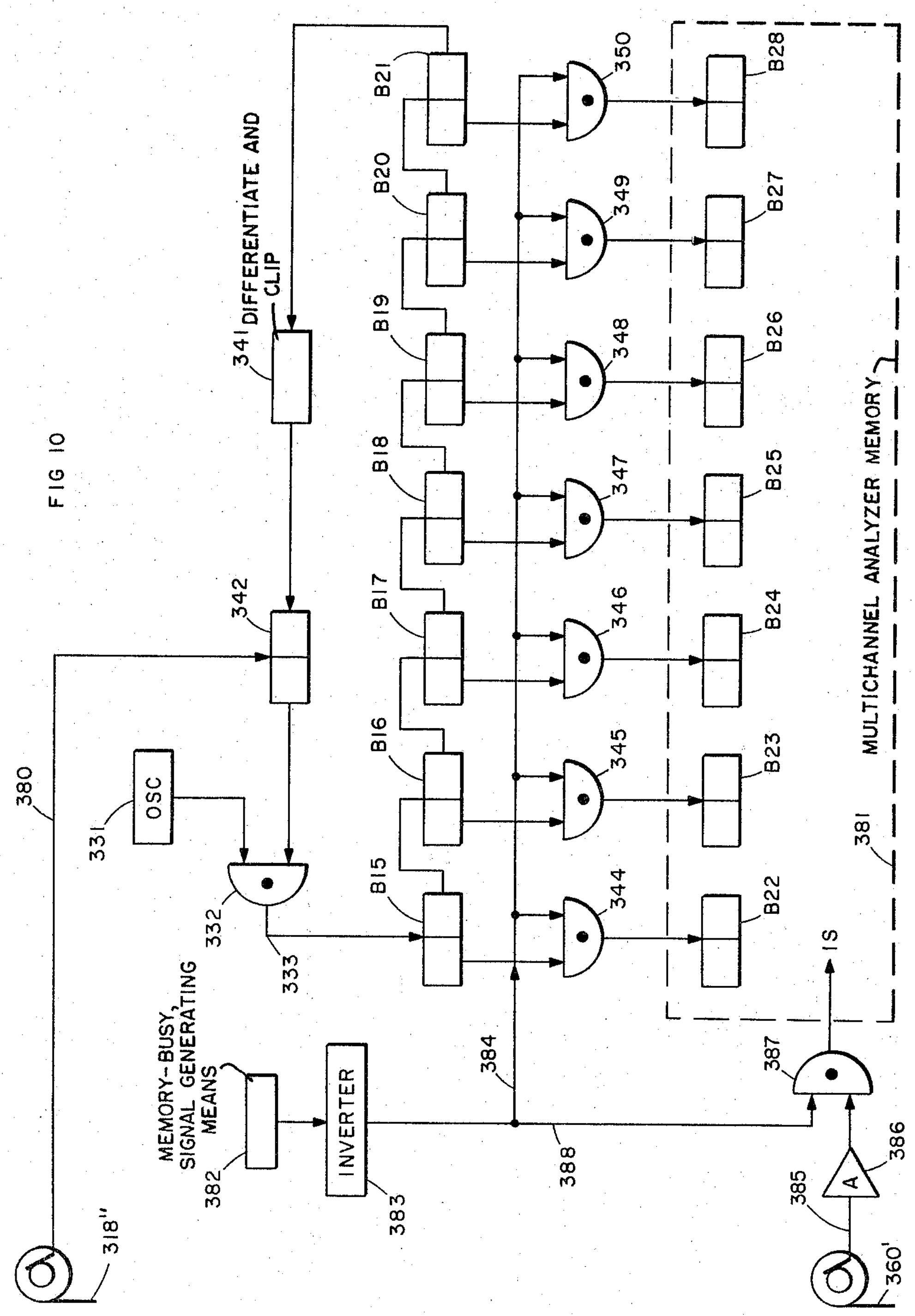
FIGURE 10 illustrates a modification wherein the system of FIGURES 7 and 8 for converting time intervals to binary information may be employed at the surface.

Referring now to FIGURE 10, there will be described a modification of the system of FIGURE 8, wherein the trigger pulses from oscillator 316 and the output from detector 307 are transmitted to the surface over two cable conductors. At the surface, the system of FIGURE 10 is employed to convert the time interval between the trigger pulses and the detector pulses to binary information for registration in the binaries of a conventional multichannel pulse height analyzer.

Oscillator 316 and detector 307 of FIGURE 8 may be coupled to two coaxial cables 318″ and 360′ for transmission of the trigger pulses and detector pulses to the surface. At the surface, the trigger pulses are taken from coaxial cable 318″ and applied by way of conductor 380 to bistable multivibrator 342. This multivibrator, oscillator 331, gate 332, binaries $B_{15}$–$B_{21}$, gates 344–350, and binaries $B_{22}$–$B_{28}$, operate in a manner similar to that described in the system of FIGURE 8. The outputs of binaries $B_{22}$–$B_{28}$, however, are applied to the memory of the multichannel analyzer which is illustrated by the dotted enclosure 381.

In the normal operation of the multichannel analyzer, a positive "memory-busy" pulse is generated during the time that the analyzer memory is storing information taken from the binary scaler. In this embodiment of the present invention, the output of the analyzer means 382, for generating the positive memory-busy signal, is applied to inverter 383. When the memory-busy signal is not being generated, the output of inverter 383 is positive. This positive output is applied by way of conductor 384 to open gates 344–350 to allow binary information to be registered in binaries $B_{22}$–$B_{28}$. The pulses from the detector 307 (FIGURE 7) are taken from coaxial cable 360′ and applied by way of conductor 385 to amplifier 386. The output of this amplifier is applied to "AND" gate 387, the output of which is employed to initiate storage, in the analyzer memory, of the binary signal registered in binaries $B_{22}$–$B_{28}$. The positive memory-busy signal, generated by the analyzer means 382, is inverted at 383 and applied by way of conductor 384 to block gates 344–350 during the time that the analyzer memory is busy. In addition, the inverted memory-busy signal is applied by way of conductor 388 to block gate 387 during the same time. When the analyzer memory has stored the previous information and the memory-busy signal is negative, the inverter 383 produces a positive output which is again applied to open gates 344–350 to allow binary information produced by binaries $B_{15}$–$B_{21}$ to be registered in the same manner as described in the system of FIGURE 8. In addition, the positive output from the inverter 383 is applied to open gate 387 to allow the next detector pulse to initiate the storage cycle.

In some instances, it may be desirable to identify elements by obtaining intensity measurements of delayed activity produced by the elements when they are irradiated with primary radiation. For example, sodium in salt water can be identified by obtaining intensity measurements of the 0.47 mev. gamma rays emitted by the sodium-24 isomer formed from sodium-23 upon the capture of thermal neutrons. When sodium-23 captures a thermal neutron, the isotope sodium-24 is formed in a highly excited state which decays in many instances to the first excited state of sodium-24 at 0.47 mev. This energy level is isomeric, having a half life of about 20 milliseconds and decaying to the ground state by the emission of 0.47 mev. gamma rays.

The intensity of these gamma rays can be measured by periodically irradiating the formations with neutrons and detecting the gamma rays after each pulse of irradiation. Continuous traces representative of the intensity of these gamma rays detected at a certain time interval after each pulse of neutrons can be obtained to identify the presence or absence of sodium and therefore of salt water. It also may be desirable to produce curves such as those illustrated in FIGURES 11 and 12. The curve of FIGURE 11 may represent the variation with time of the intensity of the 0.47 mev. gamma rays detected. The height of this curve gives information about the amount of sodium present. This curve can be converted to a semilogarithmetic plot to obtain information from the slope thereof, about the half life of the element producing the delayed radiation.

Figure 12:
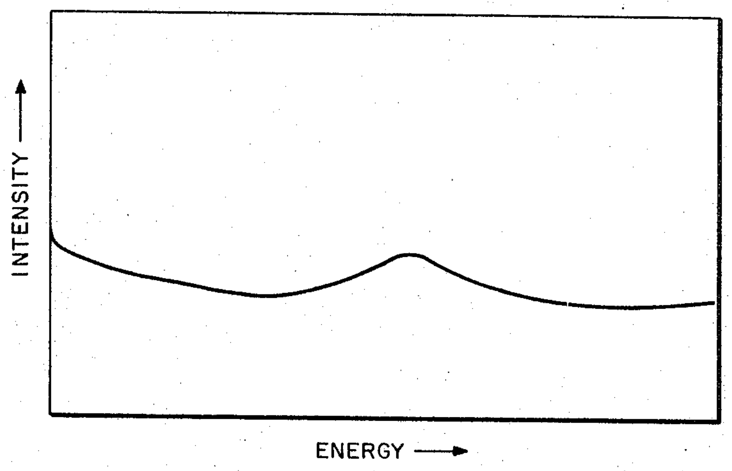
FIGURE 12 illustrates an energy spectrum useful in understanding the present invention.

The curve of FIGURE 12 represents the variation with energy of the intensity of radiation detected at a particular time after each pulse of irradiation. If the spectrum reflects an intensity peak at about 0.47 mev., then it can be determined that sodium and therefore salt water is present in the formations.

In accordance with another aspect of the present invention, the energy of the radiation detected and the time interval that the radiation is detected following each pulse of irradiation, is converted to binary information and impressed on the cable conductors for transmission to the surface of the earth. At the surface, the two types of binary information may be employed to produce curves illustrated in FIGURES 11 and 12. This information also may be employed to produce continuous traces representative of the intensity of the radiation detected at a certain energy level and at a particular time interval after each pulse of primary radiation.

Figure 13:
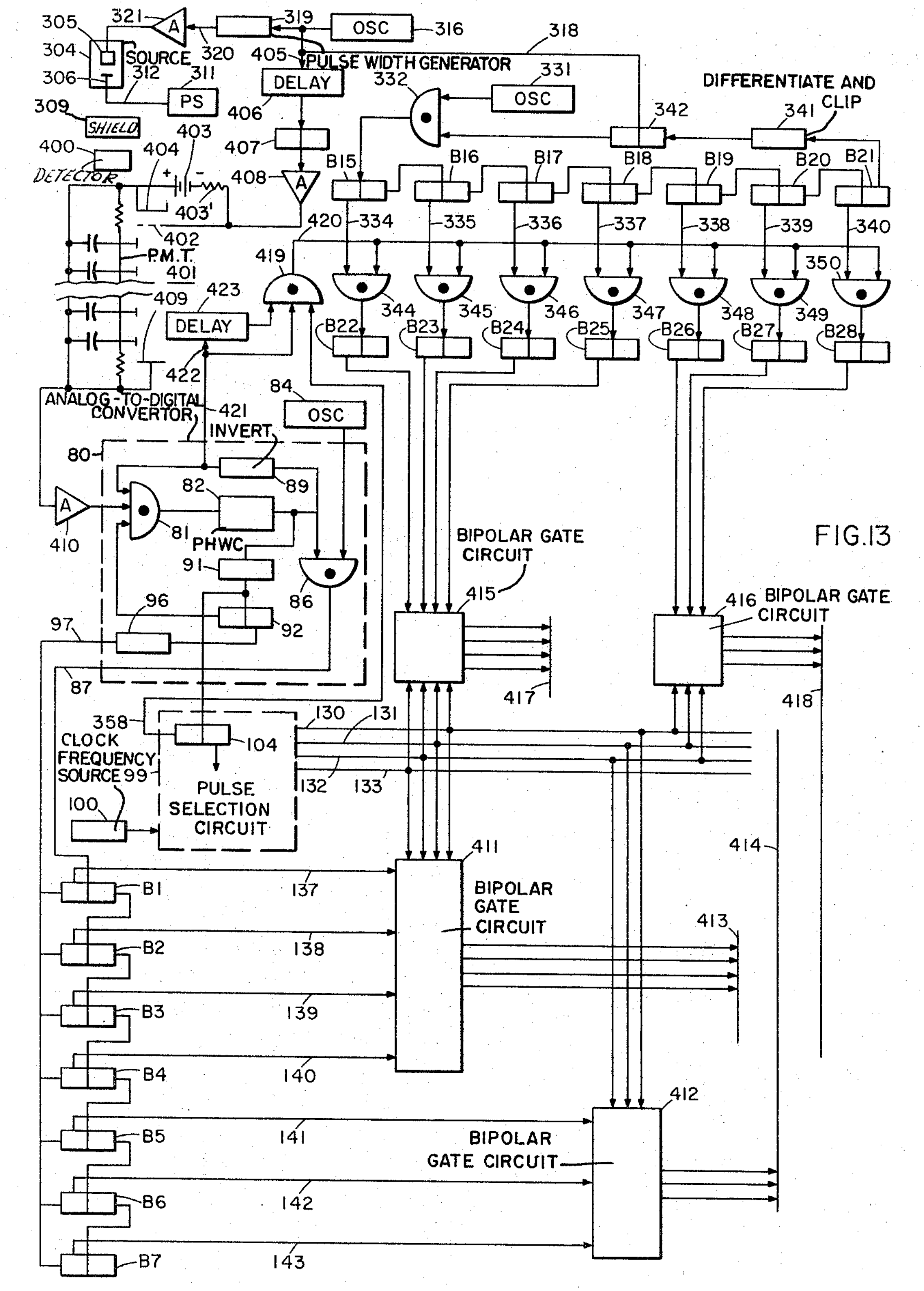
FIGURE 13 illustrates a borehole system for converting pulse height and time intervals to binary information for transmission over the cable conductors to the surface.
Figure 14:
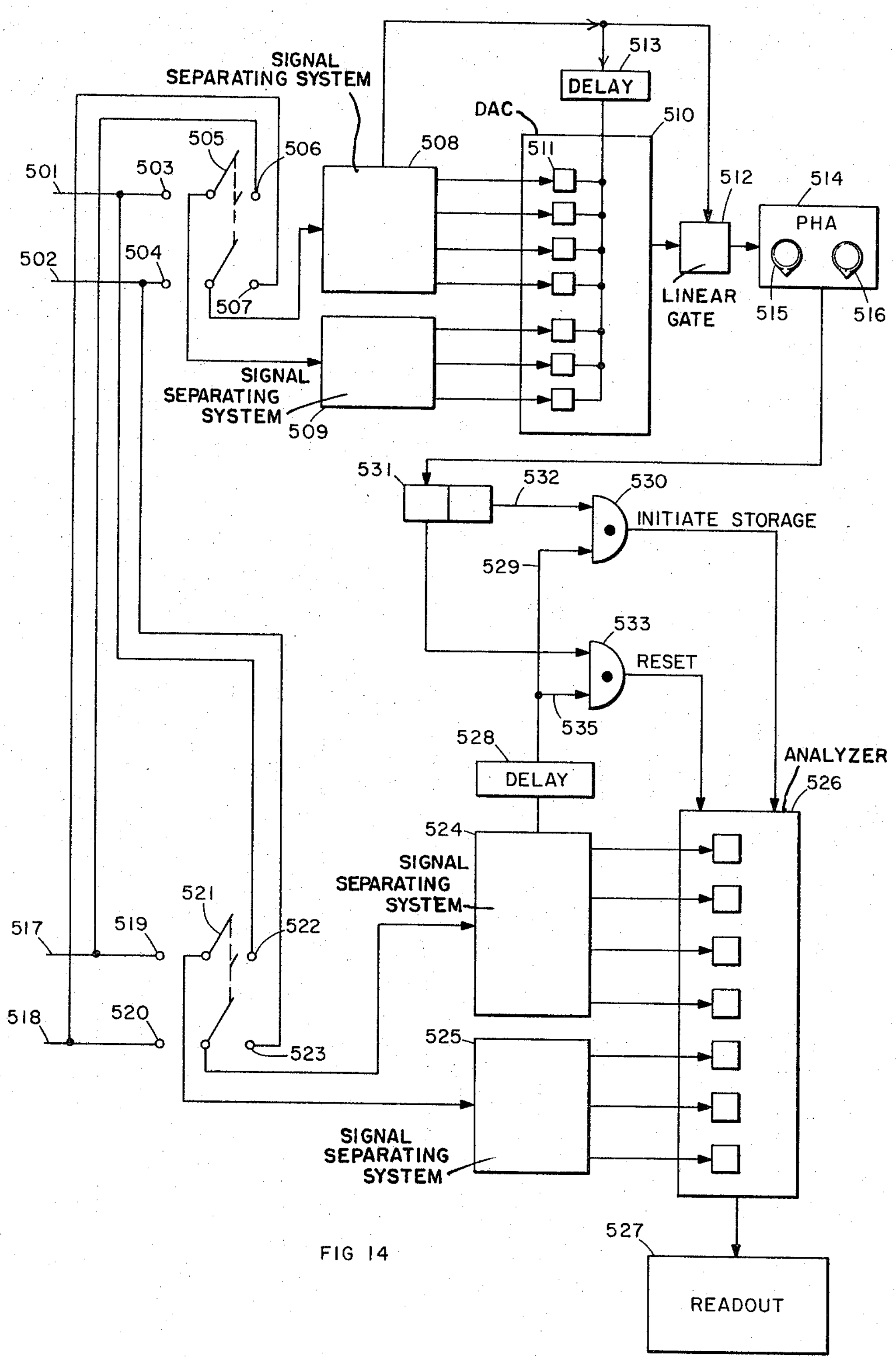
FIGURE 14 illustrates a surface system for combining binary information representative of time and pulse height for the production of useful logs.
Figure 15:
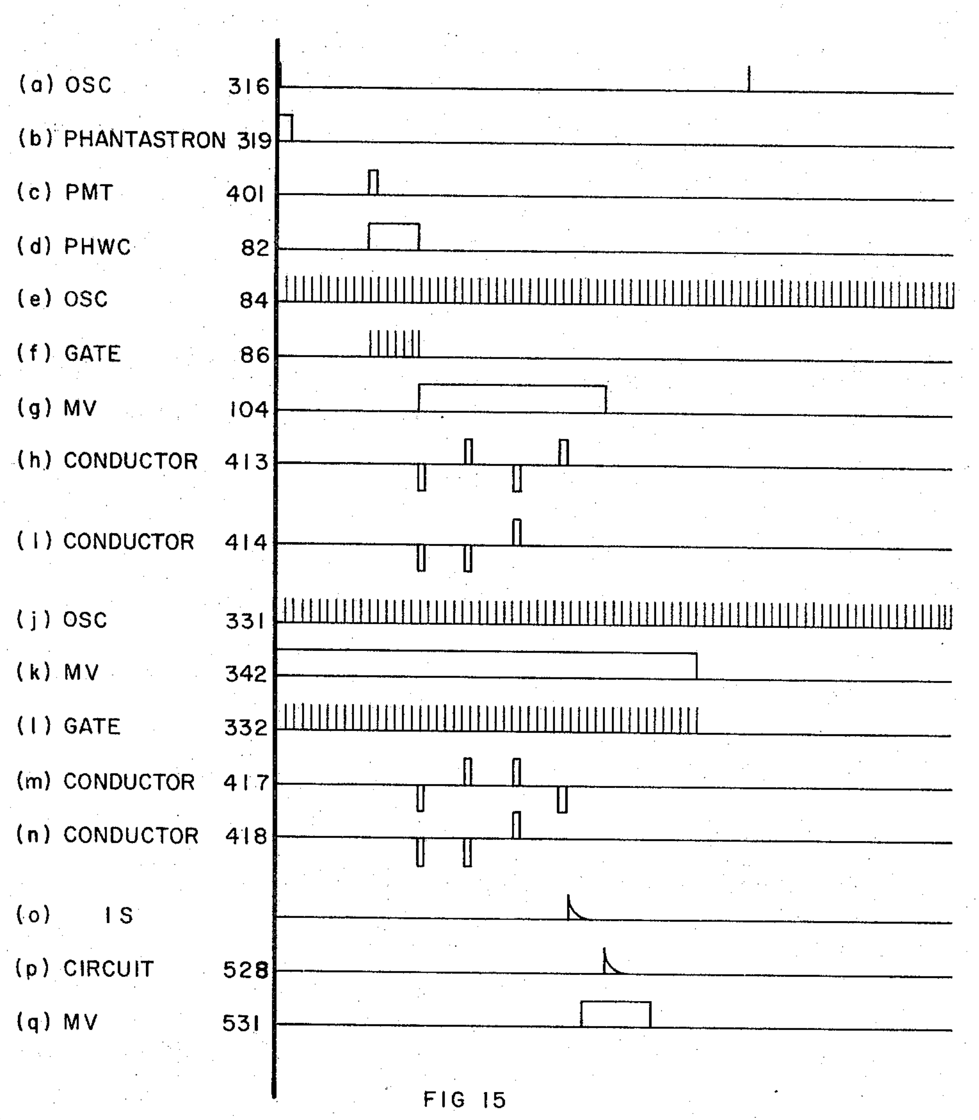
FIGURE 15 is a timing diagram useful in understanding the systems illustrated in FIGURES 13 and 14.

Referring now to FIGURES 13–15, there will be described a system for converting, in the borehole, pulse height and time to binary functions for transmission to the surface over the cable conductors. At the surface, the binary information representing energy of the radiation detected may be utilized to control the analysis of binary information representing the time interval at which the radiation is detected following each pulse of irradiation for the production, for example, of the curve of FIGURE 11. In the alternative, the binary functions representing time intervals may be utilized to control the analysis of the binary functions representing energy for the production of the curve of FIGURE 12.

Referring first to FIGURE 13, there will be described the borehole logging system. This system comprises a combination of the systems, illustrated in FIGURE 2 and in FIGURE 8, with certain modifications. Like components accordingly have been given like reference numerals.

The borehole logging instrument comprises a pulsed neutron generator 304 and a sodium iodide detector 400 coupled to a photomultiplier tube 401 which converts the scintillations into electrical pulses having a magnitude proportional to the energy of the radiation detected. The system 80 and oscillator 84 convert the pulse height to digital information which is applied to binaries $B_1$–$B_7$. System 99, clock frequency source 100, and bipolar gate systems 411 and 412 are employed to impress the binary information representing energy on two cable conductors 413 and 414. The time interval at which secondary radiation is detected following each pulse of primary radiation is converted to binary information with the aid of binary scalers $B_{15}$–$B_{21}$, gates 344–350, and binaries $B_{22}$–$B_{28}$. System 99, source 100, and bipolar gate systems 415 and 416 are employed to impress the binary information representing time on two cable conductors 417 and 418.

The pulsed neutron generator 304 is pulsed by a pulsing system which includes blocking oscillator 316 and phantastron 319, as illustrated in FIGURES 7 and 8. The photomultiplier tube 401 normally is biased to cut off during the time that the neutron generator is pulsed to prevent the high intensity radiation present during this time from affecting the gain of this tube. After the end of each pulse of neutron radiation, the photomultiplier tube is energized to an operative condition for the production of output pulses in response to radiation detected by detector 400. A negative potential normally is applied to the shield grid 402 to bias the tube to cut off. This potential is applied by source 403 connected to resistor 403', both of which are coupled between the grid 402 and cathode 404. The trigger pulses produced by blocking oscillator 316 are utilized in the production of a positive voltage of a magnitude sufficient to overcome the bias on tube 401. These trigger pulses are applied by way of conductor 405 to a delay circuit 406. The output of this circuit triggers a monostable multivibrator 407. When triggered, the right stage produces a positive pulse which is amplified at 408 and applied to shield grid 402 to overcome the bias and render the tube 401 in an operative condition for a predetermined time period between each trigger pulse.

There now will be described the portion of the borehole system which produces binary functions representative of the energy of the radiation detected. In the detection of radiation of interest, which may be a gamma radiation, the photomultiplier tube 401 produces an output, illustrated in FIGURE 15*c*, which is amplified at 410 and applied to system 80. This system is the same as that illustrated in the system of FIGURE 2 with the exception that the inverse of the output of the pulse height-to-width converter 82 is taken from the inverter 89 and used in the system for converting time to binary functions, as will be described hereinafter. As now can be understood, the output of gate 86 is a plurality of pulses proportional in number to the energy of the radiation detected. These pulses are applied to the binary scaler comprising binaries $B_1$–$B_7$. Multivibrator 104 is adjusted whereby it remains in an unstable state for a time period sufficient to allow four binary functions to be impressed on one cable conductor. The negative output of multivibrator 104 is applied to block gate 419 during the time that pulses are being impressed on the cable conductors, as will be described hereinafter.

Bipolar gate systems 411 and 412 along with system 99 and clock frequency source 100 are employed to impress signals from binaries $B_1$–$B_4$ on the cable conductor 413 and to impress signals from binaries $B_5$–$B_7$ on cable conductor 414. The signals impressed on conductors 413 and 414 may be that as illustrated respectively in FIGURES 15*h* and 15*i*. Bipolar gate system 411 comprises four sets of "AND" gates as disclosed previously and bipolar gate system 412 comprises three sets of "AND" gates.

The system for converting time into binary information and comprising oscillator 331, gate 332, multivibrator 342, binaries $B_{15}$–$B_{21}$, gates 344–350, and binaries $B_{22}$–$B_{28}$ operates in the same manner as described in the system of FIGURE 8 with the following exceptions. A positive output from "AND" gate 419 normally is applied by way of conductor 420 to open gates 344–350. The outputs of inverter 89 and of the left stage of multivibrator 104, which are normally positive, are applied to gate 419 for the production of the positive output on conductor 420.

During the time that the pulse height-to-width converter 82 is busy and also during the time that the binary functions from the binaries $B_{22}$–$B_{28}$ are being impressed upon the two conductors 417 and 418, gates 344–350 are blocked thereby preventing the outputs from binaries $B_{15}$–$B_{21}$ from being registered in binaries $B_{22}$–$B_{28}$. To block gates 344–350 during the time that pulse height-to-width converter 82 is busy, the inverse of the positive pulse produced by converter 82 is taken from inverter 89 and applied by way of conductor 421 to gate 419.

To further block gates 344–350 during the time that pulses are being impressed upon the cable conductors, the negative output from the left stage of monostable multivibrator 104 additionally is applied by way of conductor 358 to gate 419. Since there may be a time gap between the termination of negative pulses from inverter 89 and the beginning of negative pulse from the left stage of multivibrator 104, the output of inverter 89 additionally is applied by way of conductor 422 to delay circuit 423. The output of delay circuit 423 is in turn applied to block gate 419 during this time gap.

Bipolar gate system 415, which is the same as system 411, along with system 99 and source 100, is utilized to apply the outputs of binaries $B_{22}$–$B_{25}$ to cable 417. In addition, bipolar gate system 416, which is the same as system 412, along with system 99 and source 100, is utilized to apply the outputs of binaries $B_{26}$–$B_{28}$ to conductor 418. The binary functions taken from binaries $B_{22}$–$B_{25}$ and those taken from binaries $B_{26}$–$B_{28}$ may be as illustrated respectively in FIGURES 15*m* and 15*n*.

Referring now to FIGURE 14, there will be described the system employed at the surface for utilizing the two types of binary information transmitted over the four cable conductors for the production of curves of FIGURES 11 and 12. There first will be disclosed the manner in which binary information representing energy or pulse height is employed to control the analysis of the binary information representing time to produce the curve illustrated in FIGURE 11.

The binary information representative of pulse height is taken from the cable conductors and applied to conductors 501 and 502. From these conductors the information is registered in digital-to-analog converter 510, the output of which is applied to linear gate 512 and then to single channel pulse height analyzer 514. The output of the linear gate 512 will have a magnitude proportional to the energy of the radiation detected. Pulse height analyzer 514 is adjusted to produce an output only if the pulse height occurs within a given voltage range. The binary information representative of time is taken from the cable conductors and applied to conductors 517 and 518 for registration in the register of analyzer 526 which may be a multichannel analyzer. The single channel analyzer 514 in effect tells the analyzer 526 to store binary information only if the energy of the radiation detected occurs within the energy range of interest. For example, if the energy of the radiation detected falls within the energy range of interest, analyzer 514 will produce an output and binary information representative of time will be stored in the analyzer 526. However, if the energy of the radiation detected is outside of the energy range of interest, analyzer 514 will not produce an output and the binary information representative of time applied to analyzer 526 will be rejected. The output of analyzer 526 is applied to readout 527 for the production of a curve representative of the variation with time of the intensity of the radiation detected within the energy range of interest.

More particularly, to apply binary information representative of pulse height or energy to the pulse height analyzer 514, switch 505 is moved to contact terminals 503 and 504. The binary information is applied to separating systems 508 and 509 and then is registered in the seven binaries, illustrated at 511 and included in the digital-to-analog converter 510. Systems 509 and 508 may be the same as that disclosed in FIGURE 5 and modified by the system of FIGURE 6 wherein three and four binary signals may be taken from single conductors and applied respectively to three and four binaries coupled as registers. The D.-C. output of the converter 510 is applied to linear gate 512 which is of the type described previously in the system of FIGURE 5. The initiate storage pulse from system 508 is applied to trigger the linear gate 512 for the production of a pulse having a height proportional to the binary number registered in registers 511. The initiate storage pulse also is delayed at 513 and applied to reset the registers 511. Analyzer 514 is adjusted to be responsive to radiation detected within a particular energy range by adjusting the lower threshold control 515 and window width control 516 to pass electrical pulses which fall within a particular range of heights as described previously.

As mentioned above, the output of analyzer 514 is utilized to control the storage, in analyzer 526, of the binary information representative of time. To apply binary information representative of time to analyzer 526, switch 521 is closed to contact terminals 519 and 520. This allows the binary information to be applied to separating systems 524 and 525 and then for registration in the binaries of the analyzer 526. System 525 is the same as system 509 and system 524 is the same as system 508. An initiate storage pulse is taken from system 524 and applied to analyzer 526 to initiate storage when the fourth binary function from conductor 518 has been registered in the analyzer 526. This is carried out in the following manner.

The initiate storage pulse from system 524 and the output of pulse height analyzer 514 are applied to "AND" gate 530. If pulse height analyzer 514 produces an output, then gate 530 will produce an output which is applied to analyzer 526 to initiate storage. In some instances, however, there may be a delay in the transmission of the two types of binary information over the cable conductors. Thus, analyzer 514 may produce an output, however, it may not occur at the same time that the initiate storage pulse is produced by system 524. When this occurs, gate 530 will not produce an output and the binary information registered will not be stored. To prevent this, the initiate storage pulse from system 524 is delayed at circuit 528 and applied by way of conductor 529 to gate 530. This delayed signal is illustrated in FIGURE 15*p*. The output of analyzer 514 additionally is applied to trigger monostable multivibrator 531. At the outset the right stage produces a negative output. When triggered, the right stage produces a positive pulse (illustrated in FIGURE 15*q*). This positive pulse is applied by way of conductor 532 to open gate 530 for a time period sufficient to allow the delayed initiate storage pulse to pass the gate. Thus, delay circuit 528 and multivibrator 530 act to insure that an initiate storage pulse will be produced at the output of gate 530 if analyzer 514 produces an output.

If the pulses applied from the digital-to-analog converter 510, to the pulse height analyzer 514, do not have a height which falls within the limits as set by controls 515 and 516, the pulse height analyzer 514 will not produce an output. Thus, the voltage applied from the right stage of multivibrator 531 will be negative and will block gate 530, thereby preventing the delayed initiate storage pulse from passing to the analyzer 526. The binary information representative of time, however, has been registered in the binaries of the analyzer 526 and must be rejected. These binaries are reset to reject and prevent storage of this unwanted binary information. The resetting operation is accomplished by applying the positive output from the left stage of multivibrator 531 to "AND" gate 533. This positive output opens gate 533 and allows the delayed initiate storage pulse, applied by way of conductor 535 to gate 533, to reset all of the binaries in multichannel analyzer 526. As mentioned previously, the binaries of FIGURE 4 may be modified and employed as registers. The registers may be reset by applying a positive pulse to conductor 167, shown in FIGURE 4.

If it is desired to produce a curve, as illustrated in FIGURE 12, then the binary information representative of time is applied to pulse height analyzer 514 and the binary information representative of pulse height is applied to analyzer 526. This is accomplished by closing switch 505 to contact terminals 506 and 507 and closing switch 521 to contact terminals 522 and 523.

Binary information representative of the time interval that the radiation is detected is applied for registration in the binaries of the digital-to-analog converter 510. The output pulses from gate 512 have a magnitude proportional to the time that the radiation is detected. These pulses are passed by analyzer 514 only if the magnitude thereof falls within a certain voltage range. Thus, analyzer 514 produces an output only if the radiation detected occurred within the time range of interest. This output therefore controls the storage of binary information representative of pulse height and hence of the energy of the radiation detected and applied to analyzer 526. If analyzer 514 produces an output, binary information will be stored in analyzer 526. The binary information, however, will be rejected if analyzer 514 does not produce an output. Thus, the curve produced by readout 527 is representative of the variation with energy of the intensity of radiation detected within a certain time after each pulse of neutron radiation.

It is to be understood that there also may be obtained a continuous trace representative of the intensity of radiation detected within a particular energy range and at a certain time interval after each pulse of primary radiation. To obtain such traces, there are employed, instead of analyzer 526 and readout 527, a digital-to-analog converter, linear gate, single channel pulse height analyzer, count rate meter, and continuous trace recorder as described previously and illustrated in FIGURE 5. The initiate storage pulse from gate 530 triggers the linear gate, and the reset pulse from gate 533 resets the binaries of the digital-to-analog converter if unwanted information is to be rejected.

In the embodiments of the invention previously described, pulse height or time was converted downhole to binary information which was impressed on the cable conductors for transmission to the surface. In these embodiments, pulse height or time first was converted to digital information which was then converted to binary information. It is obvious from these embodiments that the digital information instead may be impressed directly on the cable conductors for transmission to the surface. The transmission of digital information also has advantages in that at the surface the height of the pulse is no longer critical nor is the time between each pulse.

There now will be disclosed systems wherein pulse height or time is converted downhole into digital information which is impressed on the cable conductors for transmission to the surface. At the surface, the digital information is applied to a binary scaler of a recording system for the production of the desired log.

Figure 16:
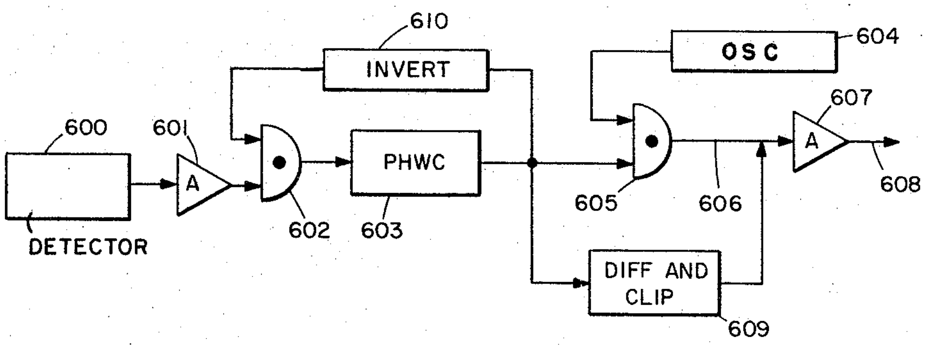
FIGURE 16 illustrates a borehole system for converting pulse height into digital information for transmission to the surface.

Referring to FIGURE 16 there will be described first the downhole pulse height digital conversion and transmission system. A detector 600 is disclosed which may be a sodium-iodide scintillation crystal coupled to a photomultiplier tube. As mentioned previously, the photomultiplier tube produces a pulse having a height proportional to the energy of the radiation detected. The output from the photomultiplier tube is amplified at 601 and applied to "AND" gate 602. The output of this gate is applied to pulse height-to-width converter 603, the output of which is applied to "AND" gate 605. The output of oscillator or source 604 also is applied to gate 605. As can be understood, the output of gate 605 is a plurality of pulses whose number is proportional to the height of the pulse applied to the height-to-width converter 603. These pulses are applied by way of conductor 606 to amplifier 607 and then to conductor 608 which passes to the surface through the cable. At the end of each burst of pulses passing gate 605, a negative pulse also is produced and transmitted to the surface by way of the cable. This negative pulse is produced by applying the pulse generated by the height-to-width converter 603 to differentiate and clip circuit 609. This circuit differentiates the pulse produced by the converter and clips the leading positive peak. The trailing negative peak is applied back to conductor 606. The signal applied to conductor 608 thus comprises a plurality of positive-going pulses followed by a negative-going pulse. To prevent the passage of pulses from detector 600 to converter 603, while it is busy, the output of the converter is inverted at 610 and applied back to block gate 602. When a conventional cable is employed, the width of pulses produced by source 604 may be 20 microseconds at time intervals of 120 microseconds.

Figure 17:
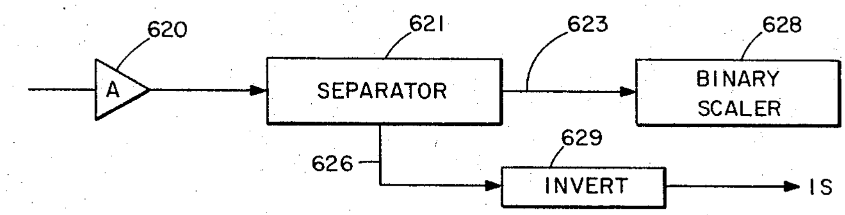
FIGURE 17 illustrates a surface system for applying the digital information to an analyzer.
Figure 18:
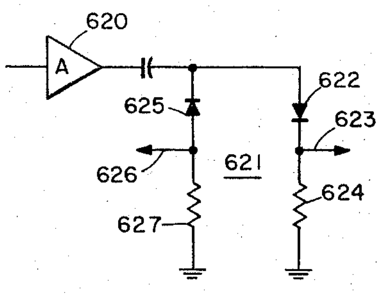
FIGURE 18 illustrates a component of the system of FIGURE 17.

The surface instrumentation is illustrated in FIGURES 17 and 18. At the surface, pulses from the cable conductor are applied to amplifier 620 and then to separator 621 also illustrated in FIGURE 18. Referring to FIGURE 18, the positive pulses pass the diode 622 and are taken from conductor 623 coupled across resistor 624. The trailing negative pulse passes diode 625 and is taken from conductor 626 coupled across resistor 627. Referring again to FIGURE 17, the positive pulses, proportional in number to the height of the pulse produced downhole, are applied from conductor 623 to the binary scaler 628 of the multichannel analyzer. The trailing negative pulse taken from conductor 626 is inverted at 629 and applied to initiate storage of the analyzer memory. Means is included in the multichannel analyzer for resetting the binary scaler after each storage operation.

Figure 19:
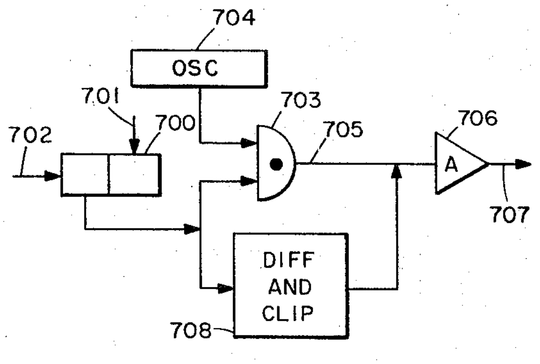
FIGURE 19 illustrates a borehole system for converting time intervals to digital information for transmission to the surface.

Referring now to FIGURE 19, there will be described a radioactive well logging system employed downhole for converting time intervals of interest to digital information for transmission to the surface. Trigger pulses from the blocking oscillator 316 of FIGURE 8 are applied by way of conductor 701 to trigger bistable multivibrator 700. The output pulses from the detector are applied by way of conductor 702 to reset this multivibrator. When the multivibrator 700 is triggered, the left stage produces a positive pulse, which is applied to open "AND" gate 703. The output of oscillator or source 704 also is applied to this gate. Thus, the output of gate 703 comprises a plurality of pulses proportional in number to the interval between the trigger pulse and the detection of the first resulting secondary radiation. These pulses are applied by way of conductor 705 to amplifier 706 and then to conductor 707 which passes through the cable to the surface of the earth. A trailing negative pulse is obtained by differentiating the positive pulse from multivibrator 700 at 708 and clipping the leading positive peak. The trailing negative peak is applied back to conductor 705 for transmission to the surface. At the surface, the pulses are applied to separator 621, illustrated in FIGURE 17. The positive pulses are applied directly to the binary scaler 628 of the multichannel analyzer and the trailing negative pulse is inverted and employed to initiate storage of the analyzer memory.

In one embodiment, the multichannel pulse height analyzer disclosed in the system of FIGURE 5 was of the type manufactured by Nuclear Data Inc., Madison, Wisconsin, Model No. 101. The single channel pulse height analyzer 213 of FIGURE 5 was of the type manufactured by Hamner Electronics Company, Princeton, New Jersey, Model No. N–601. The digital-to-analog converter disclosed in the system of FIGURE 5 and illustrated at 510 in FIGURE 14 was of the type manufactured by Epsco Inc., Equipment Division, Boston, Massachusetts, Model No. TB–809. The oscillator 84 of FIGURE 2 was a crystal oscillator, manufactured by Harman Kardon, Plainview, New York, Model No. CO–409. The neutron generator 304 of FIGURE 7 was of the type manufactured by N. V. Philips' Gloeilampenfabrieker, Eindhoven, Holland, Model No. 285, distributed in the United States by Norelco, 750 South Fulton Avenue, Mount Vernon, New York.

Now that the invention has been described, modifications will become apparent to those skilled in the art and it is intended to cover such modifications as fall within the scope of the appended claims.

What is claimed is:

1. A borehole logging system for producing intelligence signals in a borehole for transmission to the surface by way of an electrical conductor signal transmission system including at least one electrical conductor, comprising:

a logging tool including a source for applying energy to the formations of interest, means for detecting in said borehole a resulting phenomenon having characteristic parameters of interest dependent upon the formations adjacent said borehole, means for producing timing functions at a substantially constant frequency, signal producing means responsive at least to said phenomenon detected and to said timing functions for selectively forming an intelligence signal from a plurality of said timing functions proportional in number to the magnitude of at least one parameter which characterizes said phenomenon detected.

said intelligence signal including a plurality of electrical functions representative of said parameter, said signal producing means being coupled to said electrical conductor signal transmission system for applying thereto for transmission to the surface said plurality of electrical functions forming each intelligence signal, said signal producing means applying to said transmission system only electrical functions forming each intelligence signal.

2. The system of claim 1 wherein:

said parameter of interest characterizing the phenomenon detected is the energy of said phenomenon, said signal producing means being responsive to said phenomenon detected and to said timing functions for selectively forming an intelligence signal from a plurality of said timing functions proportional in number to the energy of said phenomenon detected, said intelligence signal including a plurality of electrical functions representative of the energy of said phenomenon detected.

3. The system of claim 1 wherein:

said signal producing means is responsive to said phenomenon detected and to said timing functions produced for selectively forming an intelligence signal in digital form from a plurality of said timing functions proportional in number to the magnitude of at least one parameter which characterizes said phenomenon detected, said intelligence signal including a plurality of electrical functions proportional in number to the magnitude of said parameter which characterizes said phenomenon detected.

4. The system of claim 1 wherein:

said parameter of interest characterizing the phenomenon detected is the energy of said phenomenon, said signal producing means being responsive to said phenomenon detected and said timing functions for selectively forming an intelligence signal in digital form from a plurality of said timing functions proportional in number to the energy of said phenomenon detected, said intelligence signal including a plurality of electrical functions proportional in number to the energy of said phenomenon detected.

5. The system of claim 1 wherein:

said signal producing means is responsive to said phenomenon detected and to said timing functions produced for selectively forming an intelligence signal in binary form from a plurality of said timing functions proportional in number to the magnitude of at least one parameter which characterizes the phenomenon detected, said intelligence signal including a series of electrical functions in binary form representative of said parameter.

6. The system of claim 1 wherein:

said parameter of interest characterizing the phenomenon detected is the energy of said phenomenon, said signal producing means being responsive to said phenomenon detected and to said timing functions for selectively forming an intelligence signal in binary form from a plurality of said timing functions proportional in number to the energy of said phenomenon detected, said intelligence signal including a series of electrical functions in binary form representative of the energy of said phenomenon detected.

7. The system of claim 1 wherein:

said signal producing means is responsive to said phenomenon detected and to said timing functions produced for selectively forming an intelligence signal in binary form from a plurality of said timing functions proportional in number to the magnitude of at least one parameter which characterizes the phenomenon detected, said signal producing means comprising a plurality of binaries coupled together in cascade for producing a series of electrical functions in binary form representative of the magnitude of said parameter of interest which characterizes said phenomenon detected, each of said binaries being coupled to said electrical conductor signal transmission system for application thereto of said intelligence signal in binary form for transmission to the surface.

8. The system of claim 1 wherein:

said source comprises a source of neutrons for applying neutron radiation of a given energy to the formations, and said detector comprises a detector spaced from said source for detecting the resulting secondary radiation passing from the formations into said borehole.

9. The system of claim 1 wherein said source applies primary radiation to the formations and said detector detects the resulting secondary radiation passing from the formations into said borehole, said parameter of interest being the energy of the secondary radiation detected, comprising:

means coupled to said detector for producing signal pulses each having a magnitude proportional to the energy of secondary radiation detected, said signal producing means being responsive to selected signal pulses for selectively forming an intelligence signal from a plurality of said timing functions proportional in number to the magnitude of each of sail selected pulses, said intelligence signal including a plurality of electrical functions representative of the energy of secondary radiation detected.

10. A borehole logging system for producing intelligence signals in a borehole for transmission to the surface by way of an electrical conductor signal transmission system including at least one electrical conductor comprising:

a logging instrument having a plurality of transducer means including an investigating source and a detector, actuating means for periodically causing said source to apply energy to the formations of interest thereby defining successive periods of operation, said detector being employed for detecting a resulting phenomenon within predetermined periods of operation and having characteristic parameters dependent upon the formations adjacent said borehole, means for producing timing functions at a substantially constant frequency, signal producing means responsive to said phenomenon detected and to said timing functions for selectively forming an intelligence signal from a plurality of said timing functions proportional in number to the magnitude of at least one parameter which characterizes said phenomenon detected, said intelligence signal including a plurality of electrical functions representative of said parameter, said signal producing means being coupled to said electrical conductor signal transmission system for applying thereto for transmission to the surface said plurality of electrical functions forming each intelligence signal, said signal producing means applying to said transmission system only electrical functions forming each intelligence signal.

11. The system of claim 10 wherein:

said parameter of interest characterizing said phenomenon detected is dependent upon the time of detection of said phenomenon within said predetermined periods of operation, said signal producing means being responsive to said phenomenon detected within said predetermined periods of operation and to said timing functions, for selectively forming an intelligence signal from a plurality of said timing functions proportional in number to a measure of time defined at least by the time of detection of said phenomenon by said detector within each of said predetermined periods of operation and dependent upon the formations adjacent said borehole, said intelligence signal including a plurality of electrical functions representative of said measure of time obtained within each of said predetermined periods of operation.

12. The system of claim 10 wherein:

said parameter of interest characterizing the phenomenon detected is the energy of said phenomenon, said signal producing means being responsive to said phenomenon detected and to said timing functions for selectively forming an intelligence signal from a plurality of said timing functions proportional in number to the energy of said phenomenon detected, said intelligence signal including a plurality of electrical functions representative of the energy of said phenomenon detected.

13. The system of claim 10 wherein:

said signal producing means is responsive to said phenomenon detected and to said timing functions produced for selectively forming an intelligence signal in digital form from a plurality of said timing functions proportional in number to the magnitude of at least one parameter which characterizes said phenomenon detected, said intelligence signal including a plurality of electrical functions proportional in number to the magnitude of said parameter.

14. The system of claim 10 wherein:

said parameter of interest characterizing the phenomenon detected is the energy of said phenomenon detected, said signal producing means being responsive to said phenomenon detected and to said timing functions for selectively forming an intelligence signal in digital form from a plurality of said timing functions proportional in number to the energy of said phenomenon detected, said intelligence signal including a plurality of electrical functions proportional in number to the energy of said phenomenon detected.

15. The system of claim 10 wherein:

said parameter of interest characterizing the phenomenon detected is the time of detection of said phenomenon within said predetermined periods of operation, said signal producing means being responsive to said phenomenon detected within said predetermined periods of operation and to said timing functions produced for selectively forming an intelligence signal in digital form from a plurality of said timing functions proportional in number to the time of detection of said phenomenon following a predetermined starting time within each of said predetermined periods of operation, said intelligence signal including a plurality of electrical functions proportional in number to the time of detection of said phenomenon following said starting time within each of said predetermined periods of operation.

16. The system of claim 10 wherein:

said signal producing means is responsive to said phenomenon detected and to said timing functions produced for selectively forming an intelligence signal in binary form from a plurality of said timing functions proportional in number to the magnitude of at least one parameter which characterizes said phenomenon detected, said intelligence signal including a series of electrical functions in binary form representative of said parameter.

17. The system of claim 10 wherein:

said parameter of interest characterizing said phenomenon detected is the energy of said phenomenon, said signal producing means being responsive to said phenomenon detected and to said timing functions for selectively forming an intelligence signal in binary form from a plurality of said timing functions proportional in number to the energy of said phenomenon, said intelligence signal including a series of electrical functions in binary form representative of the energy of said phenomenon.

18. The system of claim 10 wherein:

said parameter of interest characterizing the phenomenon detected is the time of detection of said phenomenon within said predetermined periods of operation, said signal producing means being responsive to said phenomenon detected within said predetermined periods of operation and to said timing functions produced for selectively forming an intelligence signal in binary form from a plurality of said timing functions proportional in number to the time of detection of said phenomenon following a predetermined starting time within each of said predetermined periods of operation, said intelligence signal including a series of electrical functions in binary form representative of the time of detection of said phenomenon following said starting time within each of said predetermined periods of operation.

19. The system of claim 10 wherein:

said signal producing means is responsive to said phenomenon detected and to said timing functions produced for selectively forming an intelligence signal in binary form from a plurality of said timing functions proportional in number to the magnitude of at least one parameter which characterizes the phenomenon detected, said signal producing means comprising a plurality of binaries coupled together in cascade for producing a series of electrical functions in binary form representative of said parameter characterizing said phenomenon detected, each of said binaries being coupled to said electrical signal transmission system for application thereto of said intelligence signal in binary form for transmission to the surface.

20. The system of claim 10 wherein:

said source comprises a source of radiation, said actuating means periodically actuating said source for the production of bursts of primary radiation spaced in time, and said detector comprises a detector for detecting the resulting secondary radiation passing from the formation into said borehole within said predetermined periods of operation.

21. The system of claim 20 wherein the parameter to be measured is the energy of the secondary radiation detected comprising:

means coupled to said detector for producing signal pulses each having a magnitude proportional to the energy of the secondary radiation detected, said signal producing means being responsive to selected signal pulses for selectively forming an intelligence signal from a plurality of said timing functions proportional in number to the magnitude of each of said selected signal pulses, said intelligence signal comprising a plurality of electrical functions representative of the energy of said secondary radiation detected.

22. The system of claim 20 wherein:

said actuating means causes an initiating pulse to be produced concomitantly with each burst of primary radiation for application to said signal producing means, said signal producing means being periodically responsive to said initiating pulse, said timing functions, and said secondary radiation detected for selectively forming an intelligence signal from a plurality of said timing functions proportional in number to the time of detection of said resulting secondary radiation following each initiating pulse within each of said predetermined periods of operation, said intelligence signal including a plurality of electrical functions representative of the time of detection of said secondary radiation following each initiating pulse within each of said predetermined periods of operation.

23. The system of claim 22 wherein:

said signal producing means comprises means responsive to each of said initiating pulses and to said timing functions for continuously producing during a predetermined time period within successive initiating pulses output functions representative of said timing functions, converting means responsive to said output functions for continuously converting, during said time period, said output functions into signal functions representative of time extending from each initiating pulse,
registering means coupled to said electrical conductor signal transmission system,
gate means coupled to said converting means and to said registering means for passing said signal functions to said registering means for registration therein, and
means responsive to said secondary radiation detected following the application of each of said initiating pulses to said signal producing means for temporarily closing said gate means to block the passage of said signal functions to said registering means for a time interval sufficient to apply the output of said registering means to said electrical conductor signal transmission system,
the output of said registering means comprising said intelligence signal representative of the time of detection of secondary radiation following each initiating pulse.

24. The system of claim 22 wherein:
said signal producing means comprises means responsive to each of said initiating pulses and to said timing functions for continuously producing during a predetermined time period within successive initiating pulses output functions representative of said timing functions,
a binary scaler means responsive to said output functions for continuously converting said output functions during said time period into a series of functions in binary form representative of time following each initiating pulse,
gate means coupled to said scaler means,
registering means coupled to said gate means and to said electrical conductor signal transmission system,
means for normally rendering said gate means operative to pass said output functions in binary form to said register for registration therein,
said last-named means being responsive to said secondary radiation detected following the application of each of said initiating pulses to said signal producing means for closing said gate means to block the passage of said functions in binary form to said register for a predetermined time interval within said time period for applying the output of said register to said electrical conductor signal transmission system,
the output of said register comprising said intelligence signal representative of the time of detection of secondary radiation following each initiating pulse.

25. In a radiation analyzing system, a system for converting time intervals of interest to a series of functions in binary form for analysis comprising:
means for periodically irradiating elements of interest with pulses of primary radiation,
means for periodically generating an initiating pulse,
a detector for detecting secondary radiation occurring after each initiating pulse,
means responsive to each of said initiating pulses for continuously producing a plurality of timing functions during a predetermined time period within successive initiating pulses,
a binary scaler means responsive to said timing functions for continuously converting said timing functions during said predetermined time period into a series of functions in binary form representative of time following each initiating pulse,
gate means coupled to said scaler means and to a registering means, and
means for normally rendering said gate means operative to pass said functions in binary form to said registering means for registration therein,
said last-named means being responsive to said secondary radiation detected for closing said gate means to block the passage of said functions in binary form to said register for a desired time interval within said time period sufficient to allow further operation to be carried out with respect to said functions in binary form registered in said registering means.

26. A system for logging the formations traversed by a borehole comprising:
a logging tool containing at least a primary radiation source and a detector for detecting secondary radiation,
means for periodically actuating said source for the production of pulses of primary radiation for irradiation of the formations thereby forming successive periods of operation,
means for continuously producing a plurality of timing functions within a predetermined time period within each period of operation,
a binary scaler coupled to said last-named means for continuously converting, during said time period, said timing functions into a series of functions in binary form representative of time extending from a predetermined starting time within each period of operation,
a register,
gate means coupled to said scaler and to said register for passing said functions in binary form to said register for registration therein, and
means responsive to said secondary radiation detected after each starting time for closing said gate means during a predetermined time interval within said time period to allow further operation to be carried out with respect to said functions in binary form registered in said register.

27. A system for use in the measurement of parameters of interest wherein energy periodically is applied to elements of interest thereby defining successive periods of operation and a resulting phenomenon detected within predetermined periods of operation comprising:
means for continuously producing a plurality of functions during a predetermined time period within said predetermined periods of investigation,
converting means responsive to said functions for continuously converting, during said time period, said functions into signal functions representative of time extending from a predetermined starting time within each of said predetermined periods of operation,
analyzing means including a register,
gate means coupled to said converting means and to said register for passing said signal functions to said register for registration therein, and
means responsive to said phenomenon detected after each starting time for closing said gate means to block the passage of said signal functions to said register for a predetermined time interval within said time period to allow further operation to be carried out with respect to said signal functions registered in said register.

28. A system for use in the measurement of radiation parameters wherein elements of interest are periodically irradiated with pulses of primary radiation thereby defining successive periods of operation and secondary radiation detected within each period of operation comprising:
means for continuously producing a plurality of functions during a predetermined time period within each period of operation,
a binary scaler responsive to said functions for continuously converting, during said time period, said functions into a series of functions in binary form representative of time extending from a predetermined starting time within each period of operation,
analyzing means including a registering means,
gate means coupled to said scaler and to said registering means for passing said functions in binary form to said registering means for registration therein, and
means responsive to said radiation detected after each starting time for closing said gate means to block the passage of said functions in binary form to said registering means for a predetermined time interval within said time period to allow further operation to be carried out with respect to said functions in binary form registered in said registering means.

29. A borehole logging system for producing intelligence signals in a borehole for transmission to the surface by way of an electrical conductor signal transmission system including at least one electrical conductor comprising:

a logging tool including an investigating source, actuating means for periodically actuating said source for periodically applying energy to the formations of interest thereby defining successive periods of operation, detecting means for detecting a resulting phenomenon within predetermined periods of operation and having characteristic parameters dependent upon the formations adjacent said borehole, means coupled to said detector for producing signal pulses having a magnitude proportional to the energy of the phenomenon detected within said predetermined periods of operation, first signal producing means selectively responsive to said signal pulses for forming first intelligence signals from a plurality of functions proportional in number to the magnitude of each of said signal pulses, said first intelligence signals each including a plurality of electrical pulses representative of the magnitude of each of said signal pulses, second signal producing means, means coupled to said actuating means for periodically applying initiating pulses to said second signal producing means, said second signal producing means being responsive to said initiating pulses and to said signal pulses for forming second intelligence signals from a plurality of functions proportional in number to the time separation between each initiating pulse and selected signal pulses produced within each period of operation, said second intelligence signals each including a plurality of electrical pulses representative of the time separation between each initiating pulse and the signal pulse produced within each period of actuation, and means for applying said first and said second intelligence signals to said electrical conductor signal transmission system for transmission to the surface.

30. The system of claim 29 wherein:

said source comprises a source of primary radiation, said actuating means periodically actuating said source for the production of bursts of primary radiation spaced in time, said detector comprising a detector for detecting the resultant secondary radiation passing from the formations into said borehole within each period of operation, said signal pulses being produced from said secondary radiation detected and having a magnitude proportional to the energy of the secondary radiation detected, said first intelligence signals being representative of the energy of the secondary radiation detected, and said second intelligence signals being representative of the time of detection of secondary radiation following each initiating pulse within each period of operation.

31. The system of claim 30 comprising:

measuring means at the surface selectively responsive to said first intelligence signals representative of energy for obtaining measurements of secondary radiation of various energies detected within a predetermined time interval within each period of operation, means responsive to said second intelligence signals representative of time for producing output functions representative of radiation detected within said predetermined time interval within each period of operation, and means for applying said output functions to said measuring means to allow selection by said measuring means of only said first intelligence signals produced from secondary radiation detected within said predetermined time interval within each period of operation.

32. The system of claim 30 comprising:

measuring means at the surface selectively responsive to said second intelligence signals representative of time for obtaining measurements of radiation detected within a predetermined energy range at various times within each period of operation, means responsive to said first intelligence signals representative of energy for producing output functions representative of radiation detected within said predetermined energy range, and means for applying said output functions to said measuring means to allow selection by said measuring means of only said second intelligence signals produced from secondary radiation detected within said predetermined energy range within each period of operation.

33. A system for use in the measurement of radiation parameters wherein elements of interest are periodically irradiated with pulses of primary radiation thereby defining successive operating periods and secondary radiation detected within predetermined periods of operation comprising:

means for producing first intelligence signals in binary form, each first intelligence signal including a series of binary functions representative of the energy of secondary radiation detected within each of said predetermined periods of operation, means for producing second intelligence signals in binary form, each second intelligence signal including a series of binary functions representative of the time of detection of secondary radiation following a predetermined starting time within each of said predetermined periods of operation, measuring means selectively responsive to said first intelligence signals representative of energy for obtaining measurements of secondary radiation of various energies detected within a predetermined time interval within each of said predetermined periods of operation, means responsive to second intelligence signals representative of time for producing output functions representative of radiation detected within said predetermined time interval within each of said predetermined periods of operation, and means for applying said output functions to said measuring means for allowing selection by said measuring means of only said first intelligence signals produced from secondary radiation detected within said predetermined time interval within each of said predetermined periods of operation.

34. A system for use in the measurement of radiation parameters wherein elements of interest are periodically irradiated with pulses of primary radiation thereby defining successive periods of operation and secondary radiation detected within predetermined periods of operation comprising:

means for producing first intelligence signals in binary form, each first intelligence signal including a series of binary functions representative of the energy of secondary radiation detected within each of said predetermined periods of operation, means for producing second intelligence signals in binary form, each second intelligence signal including a series of binary functions representative of the time of detection of secondary radiation following a predetermined starting time within each of said predetermined periods of operation, measuring means selectively responsive to said second intelligence signals representative of time for obtaining measurements of radiation detected within a predetermined energy range at various times within each of said predetermined periods of operation, means responsive to said first intelligence signals representative of energy for producing output functions representative of radiation detected within said predetermined energy range, and means for applying said output functions to said measuring means to allow selection by said measuring means of only said second intelligence signals produced from secondary radiation detected within said predetermined energy range within each of said predetermined periods of operation.

35. A borehole logging system for producing intelligence signals in a borehole for transmission to the surface by way of an electrical conductor signal transmission system including at least one electrical conductor comprising:

a logging tool including a source for applying energy to the formations of interest, means for detecting in said borehole a resulting phenomenon having characteristic parameters of interest dependent upon the formations adjacent said borehole, said detecting means producing indicating signals each having characteristics dependent upon said phenomenon detected, signal producing means responsive to each of selected indicating signals for producing an intelligence signal in binary form and including a series of electrical functions in binary form representative of at least one parameter which characterizes said phenomenon detected, and means for applying said series of electrical functions in binary for mto said electrical conductor signal transmission system for transmission to the surface.

36. The system of claim 35 wherein:

said signal producing means for producing an intelligence signal in binary form comprises means for producing a series of electrical pulses having positive and negative polarities, said series of electrical pulses forming each intelligence signal.

37. The system of claim 35 wherein:

said source comprises a source of neutrons for applying neutron radiation of a given energy to the formations, and said detector comprises a detector spaced from said source for detecting the resulting secondary radiation passing from the formations into said borehole.

38. The system of claim 35 wherein:

said parameter of interest characterizing the phenomenom detected is the energy of said phenomenon, said signal producing means being responsive to each of said selected indicating signals for producing an intelligence signal in binary form and including a series of electrical functions in binary form representative of the energy of the phenomenon detected.

39. The system of claim 35 wherein:

said source comprises a radiation source for irradiating the formations with primary radiation and said detector comprises a detector spaced from said source for detecting the resulting secondary radiation passing from the formations into said borehole, said parameter of interest characterizing the secondary radiation detected being the energy of the secondary radiation, said indicating signals produced being signal pulses each having a magnitude proportional to the energy of a secondary radiation detected, said signal producing means being responsive to each of selected signal pulses for producing an intelligence signal in binary form and including a series of electrical functions in binary form representative of the energy of the secondary radiation detected.

40. A borehole logging system for producing intelligence signals in a borehole for transmission to the surface by way of an electrical conductor signal transmission system including at least one electrical conductor comprising:

a logging instrument having a plurality of transducer means including an investigating source and a detector, actuating means for periodically causing said source to apply energy to the formations of interest thereby defining successive periods of operation, said detector being employed for detecting a resulting phenomenon within predetermined periods of operation and having characteristic parameters dependent upon the formations adjacent said borehole, said detector producing indicating signals each having characteristics dependent upon said phenomenon detected, signal producing means responsive to each of selected indicating signals for producing an intelligence signal in binary form and including a series of electrical functions in binary form representative of at least one parameter which characterizes said phenomenon detected, and means for applying said series of electrical functions in binary form to said electrical conductor signal transmission system for transmission to the surface.

41. The system of claim 40 wherein:

said parameter of interest characterizing the phenomenon detected is the energy of said phenomenon, said signal producing means being responsive to each of selected indicating signals for producing an intelligence signal in binary form and including a series of electrical functions in binary form representative of the energy of said phenomenon detected.

42. The system of claim 40 wherein:

said source comprises a source of primary radiation, said actuating means periodically actuating said source for the production of bursts of primary radiation spaced in time, said detector comprises a detector for detecting the resulting secondary radiation passing from the formations into said borehole within said predetermined periods of operation, said parameter of interest characterizing the secondary radiation detected being the energy of the secondary radiation, said indicating signals produced being signal pulses each having a magnitude proportional to the energy of the secondary radiation detected, said signal producing means being responsive to each of selected signal pulses for producing an intelligence signal in binary form and including a series of electrical functions in binary form representative of the energy of the secondary radiation detected.

43. The system of claim 40 wherein:

the parameter of interest characterizing said phenomenon detected is dependent upon the time of detection of said phenomenon within said predetermined periods of operation, said signal producing means being responsive to each of said selected indicating signals for producing an intelligence signal in binary form including a series of electrical functions in binary form representative of a measure of time defined at least by the time of detection of said phenomenon by said detector within each of said predetermined periods of operation and dependent upon the formations adjacent said borehole.

44. The system of claim 40 wherein:
said source comprises a source of primary radiation,
said actuating means periodically actuating said source for the production of bursts of primary radiation spaced in time,
said detector comprising a detector for detecting the resulting secondary radiation passing from the formations into said borehole within said predetermined periods of operation,
said indicating signals being signal pulses produced in time dependent upon the detection of said secondary radiation within said predetermined periods of operation,
said signal producing means being responsive to each of selected signal pulses for producing intelligence signals in binary form including a series of electrical functions in binary form representative of the time of detection of secondary radiation following a predetermined starting time within each of said predetermined periods of operation.

45. The system of claim 40 wherein:
the parameters of interest characterizing said phenomenon detected is the energy of said phenomenon and the time of detection of said phenomenon within each of said predetermined periods of operation,
said indicating signals produced having a magnitude proportional to the energy of said phenomenon detected and being produced in time dependent upon the detection of said phenomenon within said predetermined periods of operation,
said signal producing means including a first means responsive to each of selected indicating signals for producing a first intelligence signal in binary form and including a series of electrical functions representative of the energy of the phenomenon detected,
said signal producing means including a second means responsive to each of selected indicating signals for producing a second intelligence signal in binary form and including a series of electrical functions in binary form representative of the time of detection of said phenomenon following a predetermined starting time within each of said predetermined periods of operation.

46. The system of claim 45 wherein:
said source comprises a source of primary radiation,
said actuating means periodically actuating said source for the production of bursts of primary radiation spaced in time,
said detector comprising a detector for detecting the resulting secondary radiation passing from the formations into said borehole within each of said predetermined periods of operation,
said first intelligence signal being representative of the energy of the secondary radiation detected, and
said second intelligence signal being representative of the time of detection of said secondary radiation following said predetermined starting time within each of said predetermined periods of operation.

47. A borehole logging system for producing intelligence signals in a borehole for transmission to the surface by way of an electrical conductor signal transmission system including a plurality of electrical conductors comprising:
a logging tool including a source for applying energy to the formations of interest,
detecting means for detecting in said borehole a resulting phenomenon having characteristic parameters dependent upon the formations adjacent said borehole,
means responsive to said detecting means for producing indicating signals each having characteristics dependent upon the phenomenon detected,
signal producing means including a binary scaler means responsive to each of selected indicating signals produced for producing an intelligence signal in binary form and including a series of electrical functions representative of at least one parameter which characterizes said phenomenon detected,
said binary scaler means including a plurality of binaries coupled together in cascade for producing the series of electrical functions in binary form representative of said parameter characterizing said phenomenon detected, and
means for coupling each of said plurality of conductors to different binaries included in said binary scaler system for transmitting said series of electrical functions in binary form to the surface by way of said plurality of electrical conductors.

48. The system of claim 47 comprising:
analyzing means at the surface including a register having a plurality of binaries, and
means for coupling each of said plurality of conductors to different binaries included in said register for registration of each series of electrical functions in binary form transmitted to the surface.

49. A borehole logging system for producing intelligence signals in a borehole for transmission to the surface by way of an electrical conductor signal transmission system including at least one electrical conductor comprising:
a logging tool including a source for applying energy to the formations,
detecting means for detecting in said borehole a resultant phenomenon having characteristic parameters dependent upon the formations adjacent said borehole,
means responsive to said detecting means for producing indicating signals each having characteristics dependent upon the phenomenon detected, and
signal producing means responsive to each of selected indicating signals produced for producing an intelligence signal in digital form and including a plurality of electrical functions proportional in number to the magnitude of at least one parameter which characterizes the phenomenon detected,
said signal producing means being coupled to said electrical conductor signal transmission system for applying thereto for transmission to the surface said plurality of electrical functions forming each intelligence signal,
said signal producing means applying to said transmission system only electrical functions forming each intelligence signal.

50. The system of claim 49 wherein:
said parameter of interest characterizing the phenomenon detected is the energy of said phenomenon,
said signal producing means being responsive to each of selected indicating signals for producing an intelligence signal in digital form and including a plurality of functions proportional in number to the energy of said phenomenon detected.

51. The system of claim 49 wherein:
said source is a neutron source for emitting neutron radiation of a given energy for application to the formations and said detector detects the resulting secondary radiation passing into the borehole from said formations.

52. The system of claim 49 wherein:
said source emits primary radiation for application to the formations and said detector detects the resulting secondary radiation passing into the borehole from said formations,
said parameter of interest being the energy of the secondary radiation detected,
said indicating signals produced being signal pulses having a magnitude proportional to the energy of the secondary radiation detected, said signal producing means being responsive to each of selected signal pulses for producing an intelligence signal in digital form and including a plurality of electrical functions proportional in number to the energy of a secondary radiation detected.

53. A borehole logging system for producing intelligence signals in a borehole for transmission to the surface by way of an electrical conductor signal transmission system including at least one electrical conductor comprising:

a logging instrument having a plurality of transducer means including an investigating source and a detector, actuating means for periodically causing said source to apply energy to the formations of interest thereby defining successive periods of operation, said detector being employed for detecting a resulting phenomenon within predetermined periods of operation and having characteristic parameters dependent upon the formations adjacent said borehole, said detector producing indicating signals each having characteristics dependent upon the phenomenon detected, and signal producing means responsive to each of selected indicating signals produced for producing an intelligence signal in digital form and including a plurality of electrical functions proportional in number to the magnitude of at least one parameter which characterizes the phenomenon detected, said signal producing means being coupled to said electrical transmission system for applying thereto for transmission to the surface said plurality of electrical functions each forming each intelligence signal, said signal producing means applying to said transmission system only electrical functions forming each intelligence signal.

54. The system of claim 53 wherein:

said parameter of interest characterizing said phenomen detected is dependent upon the time of detection of said phenomenon by said detector within said predetermined periods of operation, said signal producing means being responsive to each of said selected indicating signals for producing an intelligence signal in digital form and including a plurality of electrical functions proportional in number to a measure of time defined at least by the time of detection of said phenomenon by said detector within each of said predetermined periods of operation and dependent upon the formations adjacent said borehole.

55. The system of claim 53 wherein:

said source comprises a source of primary radiation, said actuating means periodically actuating said source for periodically applying primary radiation to the formations of interest, said detector detecting the resulting secondary radiation within said predetermined periods of operation, said parameter of interest being the time of detection of secondary radiation within each of said predetermined periods of operation, said indicating signals produced being signal pulses dependent in time upon the detection of secondary radiation within said predetermined periods of operation, said signal producing means being responsive to each of selected signal pulses produced for producing an intelligence signal in digital form and including a plurality of electrical functions proportional in number to the time of detection of secondary radiation following a predetermined starting time within each of said predetermined periods of operation.

56. A borehole logging system for producing and transmitting intelligence signals to the surface by way of an electrical conductor signal transmission system including at least one electrical conductor comprising:

a logging tool including at least a detecting means for sensing conditions of interest within a borehole and having characteristic parameters of interest dependent upon the subsurface environment, means for producing timing functions at a substantially constant frequency, signal producing means responsive to each of selected conditions sensed and to said timing functions for selectively forming an intelligence signal from a plurality of said timing functions proportional in number to the magnitude of at least one parameter which characterizes said condition sensed, said intelligence signal including a plurality of electrical functions representative of said parameter of interest, said signal producing means being coupled to said electrical conductor signal transmission system for applying thereto for transmission to the surface said plurality of electrical functions forming each intelligence signal, said signal producing means applying to said transmission system only electrical functions forming each intelligence signal.

57. The system of claim 56 wherein:

the intelligence signal produced by said signal producing means comprises an intelligence signal in digital form and includes a plurality of electrical functions proportional in number to the parameter of interest.

58. The system of claim 56 wherein:

said intelligence signal produced by said generating means comprises an intelligence signal in binary form and includes a series of electrical functions in binary form representative of said parameter of interest.

59. A borehole logging system for producing and transmitting intelligence signals to the surface by way of an electrical conductor signal transmission system including at least one electrical conductor comprising:

a logging tool including at least a detecting means for sensing conditions of interest within a borehole and having characteristic parameters of interest dependent upon the subsurface environment, and signal producing means responsive to each of selected conditions sensed for forming an intelligence signal in digital form including a plurality of electrical functions proportional in number to the magnitude of at least one parameter which characterizes said condition sensed, said signal producing means being coupled to said electrical conductor signal transmission system for applying thereto for transmission to the surface said plurality of electrical functions forming each intelligence signal, said signal producing means applying to said transmission system only electrical functions forming each intelligence signal.

60. A borehole logging system for producing and transmitting intelligence signals to the surface by way of an electrical conductor signal transmission system including at least one electrical conductor comprising:

a logging tool including at least a detecting means for sensing conditions of interest within a borehole and having characteristic parameters of interest dependent upon the subsurface environment, signal producing means responsive to each of selected conditions sensed for producing an intelligence signal in binary form and including a series of electrical functions representative of the magnitude of at least one parameter which characterizes each condition sensed, and means for applying said series of electrical functions forming each intelligence signal to said electrical conductor signal transmission system for transmission to the surface.

61. A borehole logging system for producing intelligence signals in a borehole for transmission to the surface by way of an electrical conductor signal transmission system including at least one electrical conductor comprising:

a logging instrument having a plurality of transducer means including an investigating source and a detector, actuating means for periodically causing said source to apply energy to the formations of interest thereby defining successive periods of operation, said detector being employed for detecting a resulting phenomenon within predetermined periods of operation and having characteristic parameters dependent upon the formations adjacent said borehole, said detector producing indicating signals each having a magnitude proportional to the energy of said phenomenon detected and each being produced in time dependent upon the detection by said detector of said phenomenon within said predetermined periods of operation, and means responsive to each of selected indicating signals for producing first and second intelligence signals representative, respectively, of the magnitude of said phenomenon producing said selected signals and of a measure of time defined at least by the time of detection of said phenomenon by said detector within each of said predetermined periods of operation and dependent upon the formations adjacent said borehole, said last-named means being coupled to said electrical conductor signal transmission for transmission of said first and second intelligence signals to the surface.

62. A system for use in the measurement of parameters of interest wherein energy periodically is applied to elements of interest thereby defining successive periods of operations and a resulting phenomenon detected within predetermined periods of operation, and wherein first and second signals, each representative, respectively, of a distinct parameter of the phenomenon, are produced from each of selected phenomena detected, one of said parameters being the energy of the phenomenon detected and the other of said parameters being the time of detection of said phenomenon following a predetermined starting time within said predetermined periods of operation, comprising:

measuring means selectively responsive to said signals representative of one parameter for obtaining measurements of the phenomenon detected having different values of said one parameter and values of said other parameter which fall within predetermined limits, means responsive to said signals representative of said other parameter for producing output functions representative of the phenomenon detected having values of said other of said parameter which fall within said predetermined limits, and means for applying said output functions to said measuring means to allow selections by said measuring means of only said signals representative of said one parameter which are produced from phenomenon detected having values of said other parameter which fall within said predetermined limits.

References Cited by the Examiner

UNITED STATES PATENTS

| | | | |
|---|---|---|---|
| 2,991,364 | 7/1961 | Goodman | 250—83.3 |
| 3,012,140 | 12/1961 | Pellissier et al. | 250—71.5 X |
| 3,115,579 | 12/1963 | Hall et al. | 250—83.6 X |

ARCHIE R. BORCHELT, *Primary Examiner.*

RALPH G. NILSON, *Examiner.*